US012728352B2

(12) United States Patent
Takubo et al.

(10) Patent No.: US 12,728,352 B2
(45) Date of Patent: Sep. 8, 2026

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Gen Takubo, Tokyo (JP); Takuya Kawamata, Tokyo (JP); Kenji Kobayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 132 days.

(21) Appl. No.: 18/439,214

(22) Filed: Feb. 12, 2024

(65) Prior Publication Data

US 2024/0181348 A1 Jun. 6, 2024

Related U.S. Application Data

(63) Continuation of application No. PCT/JP2022/030753, filed on Aug. 12, 2022.

(30) Foreign Application Priority Data

Aug. 13, 2021 (JP) ................................ 2021-131933

(51) Int. Cl.
*A63F 13/63* (2014.01)
*A63F 13/537* (2014.01)
(Continued)

(52) U.S. Cl.
CPC ............ *A63F 13/63* (2014.09); *A63F 13/537* (2014.09); *A63F 13/58* (2014.09); *A63F 13/822* (2014.09)

(58) Field of Classification Search
CPC ........ A63F 13/63; A63F 13/537; A63F 13/58; A63F 13/822
See application file for complete search history.

(56) References Cited

U.S. PATENT DOCUMENTS

| | | | | |
|---|---|---|---|---|
| 9,861,891 B2 * | 1/2018 | Kunugi | ................. | A63F 13/825 |
| 11,130,062 B2 * | 9/2021 | Yasuhara | ............. | A63F 13/822 |

(Continued)

FOREIGN PATENT DOCUMENTS

| | | |
|---|---|---|
| JP | 2019193895 A | 11/2019 |
| JP | 2020054885 A | 4/2020 |

OTHER PUBLICATIONS

GameWith (Purikone R) Dungeon Strategy and Rewards [online], Apr. 13, 2021, https://gamewith.jp/priconere/article/show/93295 [retrieved on Jul. 28, 2021] (15 pages).

(Continued)

*Primary Examiner* — Malina D. Blaise
(74) *Attorney, Agent, or Firm* — Osha Bergman Watanabe & Burton LLP

(57) ABSTRACT

A non-transitory computer readable medium stores a program causing a computer to execute: executing a first game in which a battle game is executed and a place of a current player among a plurality of players is determined based on a result of the battle game, each of the plurality of players organizing at least one party used in the battle game; storing the at least one party of each of the plurality of players in association with a place of each of the plurality of players in the first game; selecting a party to be used in a second game from the stored parties based on a type of the second game and the place of the current player in the first game; and executing the second game in which the battle game is executed by using the selected party and a party organized by the current player.

6 Claims, 16 Drawing Sheets

(51) Int. Cl.
*A63F 13/58* (2014.01)
*A63F 13/822* (2014.01)

(56) References Cited

U.S. PATENT DOCUMENTS

| | | | | |
|---|---|---|---|---|
| 11,992,764 | B2* | 5/2024 | Wada | A63F 13/327 |
| 12,097,429 | B2* | 9/2024 | Ohashi | A63F 13/35 |
| 12,186,661 | B2* | 1/2025 | Li | A63F 13/537 |
| 12,251,633 | B2* | 3/2025 | Ueda | A63F 13/5375 |
| 2013/0288787 | A1* | 10/2013 | Yoshie | A63F 13/42 463/30 |
| 2013/0337912 | A1* | 12/2013 | Urakubo | A63F 13/80 463/31 |
| 2014/0213332 | A1* | 7/2014 | Otsuka | A63F 13/30 463/2 |
| 2014/0243095 | A1* | 8/2014 | Ikeda | A63F 13/837 463/42 |
| 2014/0327210 | A1* | 11/2014 | Gerard | A63F 13/80 273/308 |
| 2015/0231500 | A1* | 8/2015 | Aizono | A63F 13/422 463/31 |
| 2015/0265918 | A1* | 9/2015 | Yamaguchi | A63F 13/00 463/31 |
| 2015/0343309 | A1* | 12/2015 | Otomo | A63F 13/422 463/31 |
| 2016/0124518 | A1* | 5/2016 | Takahashi | G06F 3/04817 463/31 |
| 2018/0071632 | A1* | 3/2018 | Takahashi | A63F 13/55 |
| 2019/0143217 | A1* | 5/2019 | Yoneyama | A63F 13/52 463/42 |
| 2020/0276502 | A1* | 9/2020 | Gustafsson | A63F 13/53 |
| 2021/0001229 | A1 | 1/2021 | Somers et al. | |
| 2022/0387891 | A1* | 12/2022 | Suenaga | A63F 13/46 |
| 2024/0131435 | A1* | 4/2024 | Hoshino | A63F 13/822 |

OTHER PUBLICATIONS

Writing in detail the procedure for capturing the ruins of the cliff. Prikone R Dochuki—Diary of freely enjoying Prikone R -. [online], Apr. 16, 2018, https://princessconnectblog.hatenablog.jp/entry/2018/04/16/054015, [retrieved on Oct. 12, 2022] (14 pages).

Battle arena specifications and recommended formations, Princess Connect! Re: Dive (Purikone R) Cheats. [online], Sep. 21, 2020, https://web.archive.org/web/20200921091229/https://gamesink.net/priconnere/articles/665, [retrieved on Oct. 12, 2022] (17 pages).

International Search Report issued in International Application No. PCT/JP2022/030753, mailed Oct. 25, 2022 (7 pages).

Written Opinion issued in International Application No. PCT/JP2022/030753; Dated Oct. 25, 2022 (4 pages).

Office Action issued in Japanese Application No. 2021-131933; Dated May 9, 2023 (5 pages).

Office Action issued in Japanese Application No. 2021-131933; Dated Oct. 3, 2023 (3 pages).

* cited by examiner

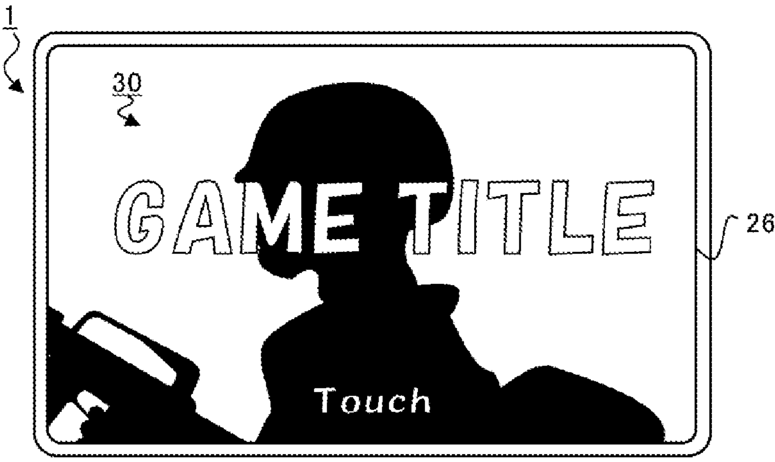
FIG.3A
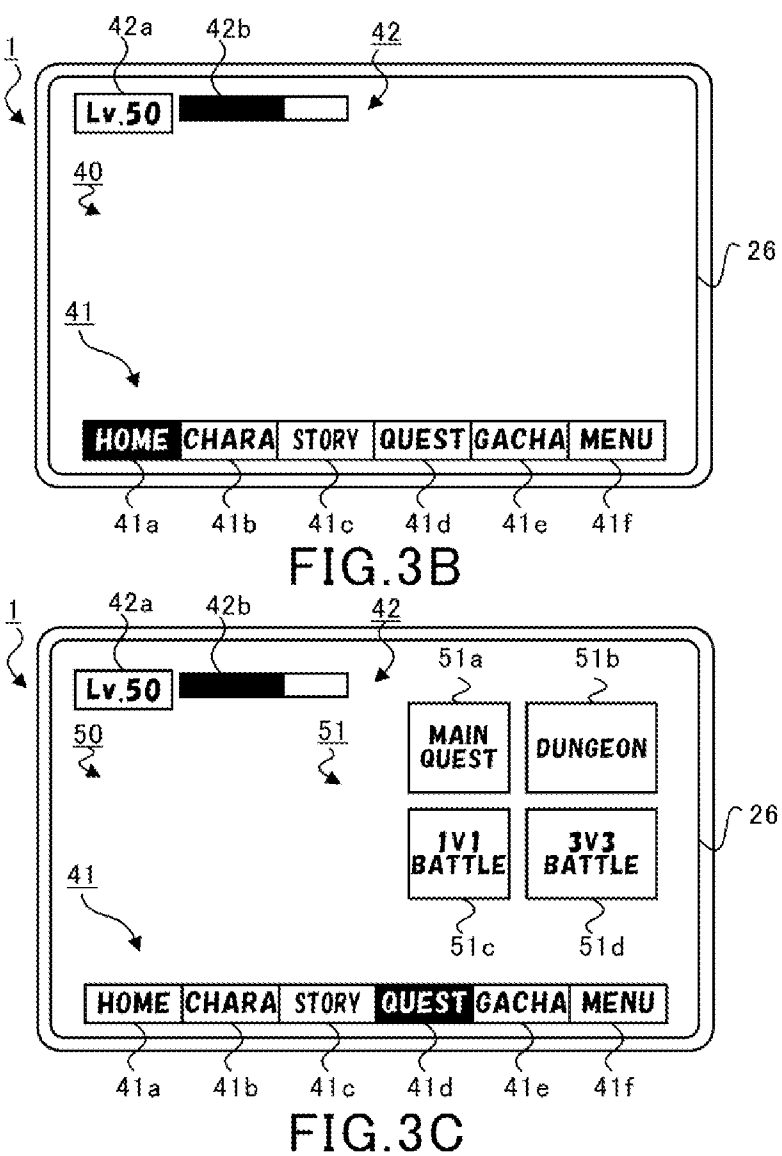
FIG.3B
FIG.3C

| FLOOR | ORGANIZATION TYPE | START PLACE | END PLACE |
|---|---|---|---|
| 1 | ATTACK | 1001 | 2000 |
| 2 | DEFENSE | 1001 | 2000 |
| 4 | ATTACK | 501 | 1000 |
| 5 | DEFENSE | 501 | 1000 |
| 7 | DEFENSE | 201 | 500 |
| 10 | ATTACK | 51 | 200 |
| 11 | DEFENSE | 51 | 200 |
| 13 | ATTACK | 1 | 50 |
| 14 | DEFENSE | 1 | 50 |

FIG.11

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2022/030753, filed on Aug. 12, 2022, which claims priority to Japanese Patent Application No. 2021-131933, filed on Aug. 13, 2021, the entire contents of which are incorporated by reference herein.

BACKGROUND ART

Technical Field

The present invention relates to an information processing program, an information processing method, and an information processing system.

There are well-known dungeons in which a player beats enemy characters present on each floor, thus aiming at finally defeating a powerful boss enemy character present on the top floor, as indicated in, for example, Non Patent Literature 1.

CITATION LIST

Non Patent Literature

Non Patent Literature 1: GameWith, [pricone R] Strategies and rewards for dungeon, [online], 13 Apr. 2021, princess connect strategy team, [retrieved on 28 Jul. 2021], Internet <URL: https://gamewith.jp/pricone-re/article/show/93295>

SUMMARY OF INVENTION

Technical Problem

Here, the trend of party organizations organized with characters of a player changes as the game is updated. On the other hand, if a party organization organized with fixed enemy characters is set for each floor in a dungeon, it is not possible to set a party organization that matches the trend changing as the game is updated, making it difficult to enhance the fun of the game.

An object of the present invention is to provide an information processing program, an information processing method, and an information processing system capable of enhancing the fun of a game.

Solution to Problem

In order to solve the aforementioned problem, an information processing program causes a computer to execute: a process for executing first content in which a battle game is executed by using a plurality of items of first organization information organized by a plurality of players, and places of the players are determined on the basis of a result of the battle game; a process for storing the items of first organization information organized by the plurality of players in association with the places; a process for selecting any of the plurality of stored items of first organization information on the basis of a type of a battle game to be played by a player and the places associated with the items of first organization information; and a process for executing second content in which the battle game is advanced by using the selected first organization information and second organization information organized by the player.

Each of the items of first organization information may have an organization type including an attack organization and a defense organization, and in the selecting process, any of the plurality of stored items of first organization information may be selected on the basis of the type of the battle game, the places, and the organization type.

In the selecting process, the higher the degree of progress of the battle game is, the higher the place of the first organization information selected from among the plurality of stored items of first organization information may be.

In order to solve the aforementioned problem, an information processing method is executed by at least one computer and includes: a process for executing first content in which a battle game is executed by using a plurality of items of first organization information organized by a plurality of players, and places of the players are determined on the basis of a result of the battle game; a process for storing the items of first organization information organized by the plurality of players in association with the places; a process for selecting any of the plurality of stored items of first organization information on the basis of a type of a battle game to be played by a player and the places associated with the items of first organization information; and a process for executing second content in which the battle game is advanced by using the selected first organization information and second organization information organized by the player.

In order to solve the aforementioned problem, an information processing system includes at least one computer, and the computer executes: a process for executing first content in which a battle game is executed by using a plurality of items of first organization information organized by a plurality of players, and places of the players are determined on the basis of a result of the battle game; a process for storing the items of first organization information organized by the plurality of players in association with the places; a process for selecting any of the plurality of stored items of first organization information on the basis of a type of a battle game to be played by a player and the places associated with the items of first organization information; and a process for executing second content in which the battle game is advanced by using the selected first organization information and second organization information organized by the player.

Effects of Disclosure

According to the present invention, it is possible to enhance the fun of a game.

BRIEF DESCRIPTION OF DRAWINGS

FIG. 3A is a diagram showing an example of a title screen.

FIG. 3B is a diagram showing an example of a home screen.

FIG. 3C is a diagram showing an example of a quest screen.

FIG. 11 is a drawing for showing an example of list information for setting enemy characters in a special dungeon.

DESCRIPTION OF EMBODIMENTS

An aspect of an embodiment according to the present invention will be described in detail below with reference to the accompanying drawings. The dimensions, materials, other specific numerical values, etc. given in this embodiment are merely examples for facilitating understanding and do not limit the present invention unless otherwise specifically mentioned. In this description and the drawings, the same reference signs are attached to elements having substantially the same functions and configurations, omitting repeated descriptions thereof, and elements that are not directly related to the present invention are not shown.

(Overall Configuration of Information Processing System S)

Figure 1:
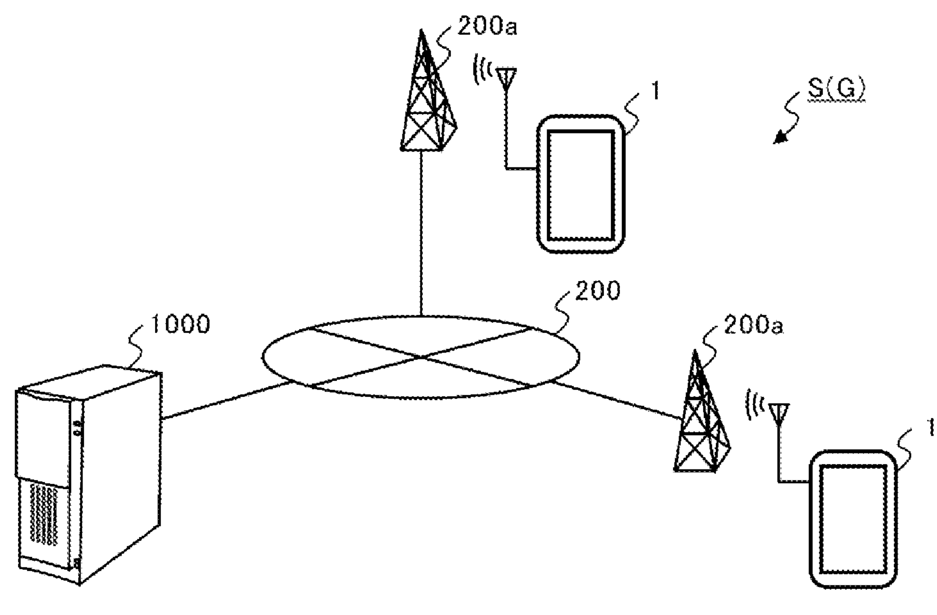
FIG. 1 is an illustration showing a schematic configuration of an information processing system.

FIG. 1 is an illustration showing a schematic configuration of an information processing system S. The information processing system S is a so-called client-server system that includes: player terminals 1; a server 1000; and a communication network 200 having communication base stations *200a*.

Each of the player terminals (information processing devices) 1 can establish communication with the server 1000 via the communication network 200. The player terminals 1 widely include electronic appliances that can be communicatively connected to the server 1000 by wire or wirelessly. Examples of the player terminals 1 include smartphones, mobile phones, tablet devices, personal computers, game machines, etc. This embodiment will be described in the context of the case where smartphones are used as the player terminals 1.

The server 1000 is configured so as to be capable of communicating with the plurality of player terminals 1 and is communicatively connected to the plurality of player terminals 1. The server 1000 accumulates various types of information (referred to, hereinafter, as player information) for each item of player identification information (referred to, hereinafter, as a player ID) for identifying players playing the game.

The communication base stations *200a* are connected to the communication network 200, and transmit information to and receive information from the player terminals 1 wirelessly. The communication network 200 is configured of a mobile phone network, the Internet, a local area network (LAN), a dedicated line, etc., and realizes wired or wireless communicative connection between the player terminals 1 and the server 1000.

In the information processing system S according to this embodiment, the player terminals 1 and the server 1000 function as a game device G. The player terminals 1 and the server 1000 individually have assigned thereto roles for controlling the proceeding of the game such that it is possible to proceed with the game through cooperation between the player terminals 1 and the server 1000.

(Hardware Configurations of Player Terminal 1 and Server 1000)

Figure 2A:
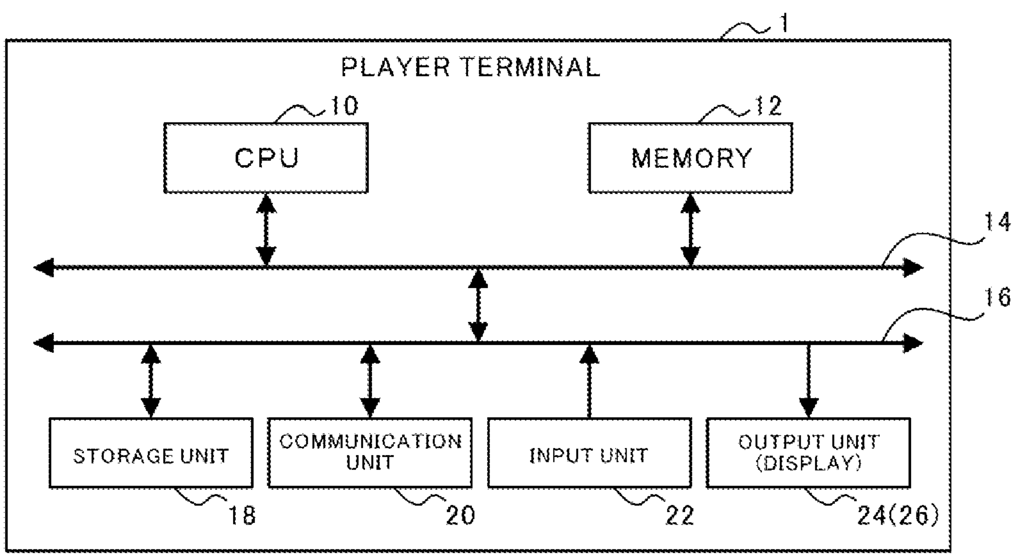
FIG. 2A is a drawing for illustrating the hardware configuration of a player terminal.
Figure 2B:
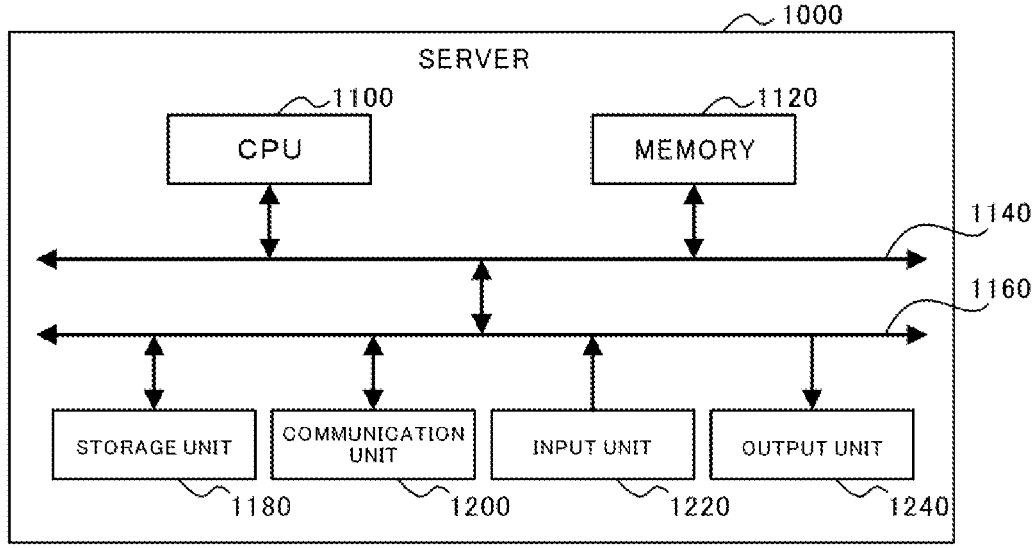
FIG. 2B is a drawing for illustrating the hardware configuration of a server.

FIG. 2A is a drawing for illustrating the hardware configuration of a player terminal 1. In addition, FIG. 2B is a drawing for illustrating the hardware configuration of the server 1000. As shown in FIG. 2A, the player terminal 1 is configured to include at least one central processing unit (CPU) 10, a memory 12, a bus 14, an input/output interface 16, a storage unit 18, a communication unit 20, an input unit 22, and an output unit 24.

Furthermore, as shown in FIG. 2B, the server 1000 is configured to include at least one CPU 1100, a memory 1120, a bus 1140, an input/output interface 1160, a storage unit 1180, a communication unit 1200, an input unit 1220, and an output unit 1240.

The configurations and functions of the CPU 1100, the memory 1120, the bus 1140, the input/output interface 1160, the storage unit 1180, the communication unit 1200, the input unit 1220, and the output unit 1240 of the server 1000 are substantially the same as those of the CPU 10, the memory 12, the bus 14, the input/output interface 16, the storage unit 18, the communication unit 20, the input unit 22, and the output unit 24, respectively, of the player terminal 1. Thus, a description of the hardware configuration of the player terminal 1 will be given below, and a description of the server 1000 will be omitted.

The CPU 10 runs programs stored in the memory 12 to control the proceeding of the game. The memory 12 is configured of a read only memory (ROM) or a random access memory (RAM), and stores programs and various types of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various types of programs and data. At the player terminal 1, programs and data stored in the storage unit 18 are loaded into the memory 12 (RAM) by the CPU 10.

The communication unit 20 is communicatively connected to the communication base stations 200*a* in a wireless manner, and transmits information to and receives information from the server 1000 via the communication network 200, such as various types of data and programs. At the player terminal 1, the programs, etc. received from the server 1000 are stored in the memory 12 or the storage unit 18.

The input unit 22 is configured of, for example, a touchscreen, buttons, a keyboard, a mouse, a cross key, or an analog controller with which player operations are input (operations are accepted). Alternatively, the input unit 22 may be a special controller provided in the player terminal 1 or connected (externally attached) to the player terminal 1. Alternatively, the input unit 22 may be configured of an acceleration sensor that detects tilting or movement of the player terminal 1 or a microphone that detects speech of the player. That is, the input unit 22 widely includes devices that enable the player to input his or her intents in distinguishable manners.

The output unit 24 is configured to include a display device and a speaker. The output unit 24 may be a device connected (externally attached) to the player terminal 1. In this embodiment, the player terminal 1 is provided with a display (display unit) 26 as the output unit 24 and is provided with a touchscreen as the input unit 22, wherein the touchscreen is overlaid on the display 26.

(Game Content)

Next, content of the game provided by the information processing system S (game device G) according to this embodiment will be described by way of an example. This embodiment provides a so-called battle game in which ally characters combat against enemy characters. The game administrator provides a player with a plurality of ally characters in the game according to this embodiment. For example, the player can possess a plurality of ally characters earned by lottery, which is a so-called gacha, or a plurality of ally characters distributed by the game administrator.

The player can select a plurality (five here) of ally characters from among the possessed ally characters, thereby organizing a party. The player can play a battle game by using the organized party. The purpose of a battle game is to earn a reward by beating the enemy characters (clearing the battle game) by means of the ally characters organized into a party. The player can play a plurality of types of battle games with different enemy characters and difficulty levels.

FIG. 3A is a diagram showing an example of a title screen 30. FIG. 3B is a diagram showing an example of a home screen 40. FIG. 3C is a diagram showing an example of a quest screen 50. Game screens as shown in FIGS. 3A, 3B, and 3C are displayed on the display 26 of the player terminal 1. In this embodiment, the game screens are roughly classified into normal screens and a battle screen.

The normal screens mainly include a screen on which the player waits for a game to start and a screen on which the player performs various types of settings and confirms information. On the other hand, the battle screen is a screen displayed on the display 26 from the start to the end of a battle game. Here, all screens other than the battle screen are normal screens. The normal screens include a plurality of screens, such as the title screen 30 shown in FIG. 3A, the home screen 40 shown in FIG. 3B, the quest screen 50 shown in FIG. 3C, a gacha screen (not shown in the figure), and a menu screen (not shown in the figure).

The title screen 30 shown in FIG. 3A is a screen that is displayed first on the display 26 when the game is started on the player terminal 1. As shown in FIG. 3A, for example, the title name of the game that has been started is displayed on the title screen 30. Note that, besides the title name of the game, the name of the game administering company may be displayed on the title screen 30. Also, an image or a video suggesting the content of the game is displayed on the title screen 30 as a background of the title name of the game and the name of the game administrating company. For example, the background includes information about characters appearing in the main part of the game, information about the story of the main part of the game, etc.

In addition, game start operation information "Touch", which suggests an operating procedure necessary for starting the game, is displayed on the title screen 30. In this embodiment, the game is started by the player tapping the display 26 on the title screen 30.

The home screen 40 shown in FIG. 3B is a screen that is displayed first after the player has tapped the display 26 on the title screen 30 (i.e., after the game has been started). As shown in FIG. 3B, on the home screen 40, a menu bar 41 is displayed in the lower section of the display 26. The menu bar 41 is displayed in the lower section of the display 26 on normal screens other than the title screen 30.

A plurality of operation sections that can be operated (tapped) by the player are provided in the menu bar 41. A home-screen selection operation section 41*a* captioned "Home", an ally-character confirmation-screen selection operation section 41*b* captioned "Chara", a story-screen selection operation section 41*c* captioned "Story", a quest-screen selection operation section 41*d* captioned "Quest", a gacha-screen selection operation section 41*e* captioned "Gacha", and a menu-screen selection operation section 41*f* captioned "Menu" are provided in the menu bar 41. Note that in the menu bar 41, the operation section corresponding to each screen is highlighted so that the screen being displayed on the display 26 can be identified.

When the home-screen selection operation section 41*a* is tapped, the home screen 40 shown in FIG. 3B is displayed on the display 26. In addition, when the ally-character confirmation-screen selection operation section 41*b* is tapped, an ally character confirmation screen (not shown in the figure) is displayed on the display 26. In addition, when the story-screen selection operation section 41*c* is tapped, a story screen (not shown in the figure) is displayed on the display 26. In addition, when the quest-screen selection operation section 41*d* is tapped, the quest screen 50 shown in FIG. 3C is displayed on the display 26.

In addition, when the gacha-screen selection operation section 41*e* is tapped, the gacha screen (not shown in the figure) is displayed on the display 26. The gacha screen allows the player to perform a gacha lottery, in which an ally character can be earned by lottery.

Furthermore, when the menu-screen selection operation section 41*f* is tapped, the menu screen (not shown in the figure) is displayed on the display 26. In addition, various types of information can be confirmed on the menu screen.

A header display region 42 is provided in the upper section of the home screen 40. Player information associated with the player ID is displayed in the header display region 42. For example, level information 42*a* indicating the player level and a stamina indication bar 42*b* indicating the stamina of the player are displayed in the header display region 42. The player information includes the player ID, ally character identification information (referred to, hereinafter, as an ally character ID) for identifying ally characters possessed by the player, the level information 42*a*, stamina information displayed in the stamina indication bar 42*b*, clearance information of battle games, etc.

Note that the stamina is a parameter required for the player to play a battle game. In this embodiment, a plurality of types of battle games are provided, and each battle game has set therein a stamina consumption value required to play the battle game, the maximum number of times per day the battle game can be executed, etc. In the case where the player is going to play a battle game in which a stamina consumption value required to play the battle game is set, the player can play the battle game by consuming stamina. Therefore, the player cannot play the battle game when the stamina is insufficient.

When the ally-character confirmation-screen selection operation section 41*b* in the menu bar 41 is tapped, the ally character confirmation screen (not shown in the figure) is displayed on the display 26. All images of the ally characters corresponding to the ally character IDs associated with the player ID are displayed on the ally character confirmation screen.

That is, all ally characters possessed by the player are displayed on the ally character confirmation screen. Note that ally characters are assigned ally character IDs that differ from one another. Also, when the player earns a new ally character by, for example, a gacha lottery, etc., the ally character ID of the earned ally character is associated with the player ID of the player.

For each of the ally character IDs, information about an experience value and information about the level are stored in association therewith. The experience value increases when the player wins a battle game (described below) or uses a predetermined item. The level is set in accordance with the experience value, and the level increases each time the experience value reaches a predetermined value. Note that an upper limit of the level is set in each of the ally characters, and the level increases only within the range defined by the upper limit value.

In addition, base values of battle abilities, including life points, an attacking power, a defending power, etc. are set in each of the ally characters on the basis of the level. The higher the battle abilities of each of the ally characters is, the more advantageous the player becomes in proceeding with a battle game. In addition, the higher the level, the higher each of the base values set in each of the ally characters.

Furthermore, ally characters can be equipped with items of equipment such as weapons and protectors (ally characters can have items of equipment set thereon). Each of the items of equipment has set therein an additional value to the attacking power, the defending power, etc. When an ally character is equipped with equipment, the additional value of the equipment is added to the aforementioned base values, making it possible to enhance the battle abilities of the ally character. Information about these items of equipment such as weapons and protectors is also associated with the ally character ID and constitutes a portion of the player information.

When the operation section 41*d* in the menu bar 41 is tapped, the quest screen 50 shown in FIG. 3C is displayed on the display 26. The menu bar 41, the header display region 42, and a plurality of game-type selection operation sections 51 captioned the respective type names of provided battle games are displayed on the quest screen 50. Here, four types of battle games are provided, and four game-type selection operation sections 51 are displayed, accordingly.

The game-type selection operation sections 51 include: a main-quest selection operation section 51*a* captioned "Main quest"; a dungeon selection operation section 51*b* captioned "Dungeon"; a 1V1-battle selection operation section 51*c* captioned "1V1 battle"; and a 3V3-battle selection operation section 51*d* captioned "3V3 battle". When the main-quest selection operation section 51*a* in FIG. 3C is tapped, a main quest screen 72 shown in FIG. 4A is displayed on the display 26.

Figure 4A:
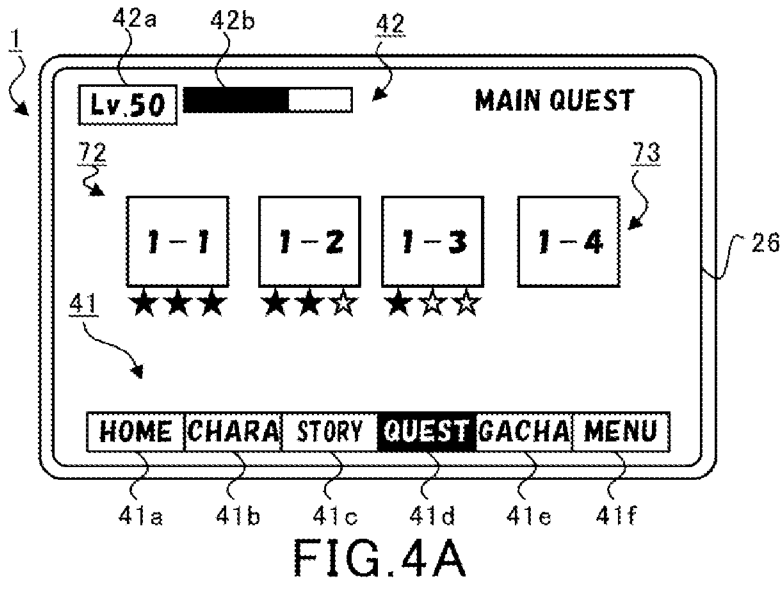
FIG. 4A is a drawing for illustrating an example of a main quest screen.
Figure 4B:
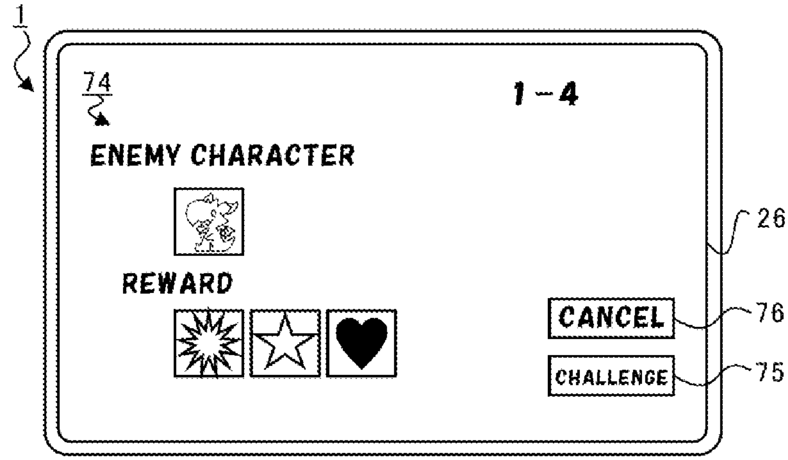
FIG. 4B is a drawing for illustrating an example of a main quest selection screen.
Figure 4C:
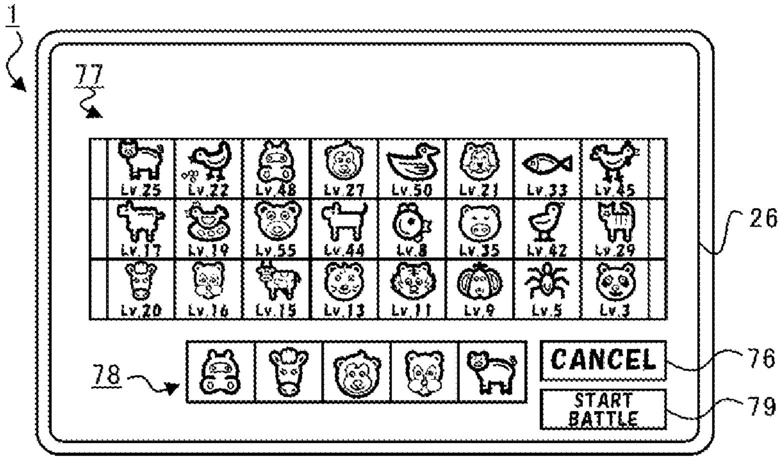
FIG. 4C is a drawing for illustrating an example of a party selection screen.

FIG. 4A is a drawing for illustrating an example of the main quest screen 72. FIG. 4B is a drawing for illustrating an example of a main quest selection screen 74. FIG. 4C is a drawing for illustrating an example of a party selection screen 77.

The menu bar 41, the header display region 42, and a quest operation section 73 for selecting a plurality of battle games belonging to the main quest are displayed on the main quest screen 72.

In the quest operation section 73, clearance information of the battle games is displayed together. The clearance information is indicated with, for example, three stars. When a battle game belonging to the main quest is cleared, stars are earned according to the number of ally characters whose life points are 0 at the time the battle game is cleared. For example, three stars are earned in the case where there are no ally characters whose life points are 0. Two stars are earned in the case where there is one ally character whose life points are 0. One star is earned in the case where there are two or more ally characters whose life points are 0.

In the example of FIG. 4A, three stars are earned for the "1-1" battle game, two stars are earned for the "1-2" battle game, and one star is earned for the "1-3" battle game. In addition, no stars are earned for the "1-4" battle game, indicating that this battle game is not cleared.

Note that, in the main quest, the release condition that the previous battle game must be cleared is set. For example, in the example of FIG. 4A, because the battle games up to the "1-3" battle game are cleared, the "1-4" battle game is released. The subsequent battle games ("1-5" and after, not shown in the figure) are not released.

When the quest operation section 73 corresponding to, for example, the "1-4" battle game is operated (tapped) on the main quest screen 72, the main quest selection screen 74 shown in FIG. 4B is displayed on the display 26. On the main quest selection screen 74, an enemy character who will appear in the battle game and items (rewards) that can be earned in the battle game are displayed. In addition, on the main quest selection screen 74, a challenge operation section 75, captioned "Challenge", for challenging the battle game, as well as a cancel operation section 76, captioned "Cancel", for cancelling the processing corresponding to the currently displayed screen are displayed.

When the cancel operation section 76 is operated (tapped), the main quest screen 72 shown in FIG. 4A is displayed on the display 26, and a challenge to the selected "1-4" battle game is cancelled.

On the other hand, when the challenge operation section 75 is operated (tapped), the party selection screen 77 shown in FIG. 4C is displayed on the display 26. On the party selection screen 77, all ally characters possessed by the player are displayed, and, below the ally characters, a selected-ally-character display region 78 for displaying the selected ally characters is displayed.

In addition, on the party selection screen 77, the cancel operation section 76 and a battle-start operation section 79, captioned "Start battle", are displayed.

On the party selection screen 77, when the player operates (taps) a displayed ally character, the operated ally character is displayed in the selected-ally-character display region 78. More specifically, here, ally character IDs to be used in the battle game (to determine a party) are selected from among the plurality of ally character IDs associated with the player ID. A party is organized as a result of the player selecting a plurality of ally characters. Note that the same ally character cannot be set in duplicate in a party organization.

When a party organization is completed and the battle-start operation section 79 is operated (tapped), the battle game is started, displaying a battle game screen 80 on the display 26.

Figure 5A:
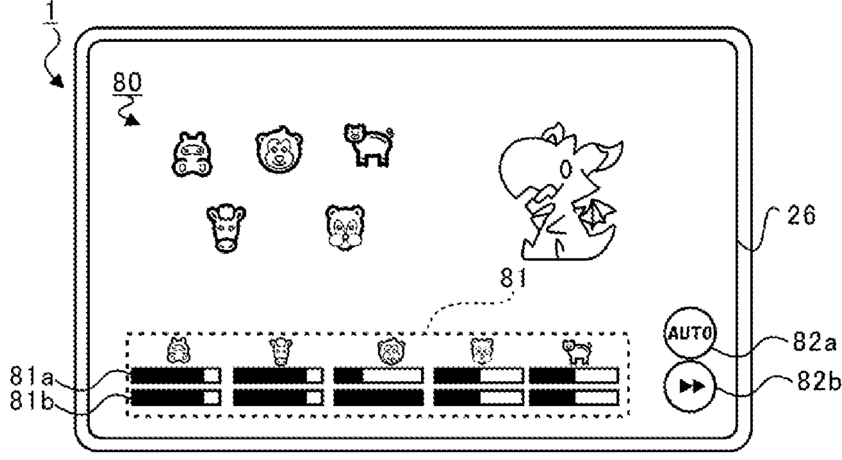
FIG. 5A is a drawing for illustrating an example of a battle game screen.
Figure 5B:
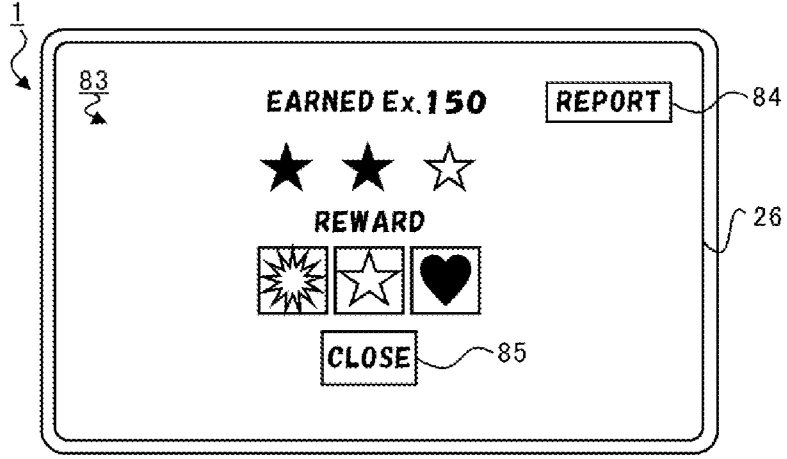
FIG. 5B is a drawing for illustrating an example of a result screen.
Figure 5C:
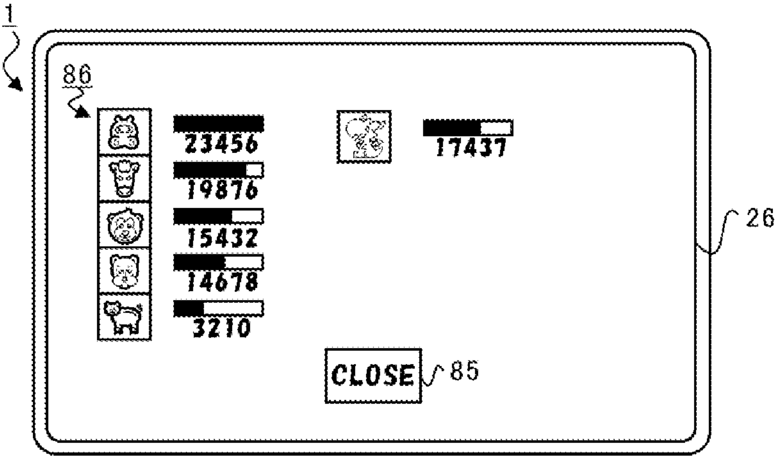
FIG. 5C is a drawing for illustrating an example of a report screen.

FIG. 5A is a drawing for illustrating an example of the battle game screen 80. FIG. 5B is a drawing for illustrating an example of a result screen 83. FIG. 5C is a drawing for illustrating an example of a report screen 86. The battle game screen 80 is displayed during the battle game, as shown in FIG. 5A. On the battle game screen 80, ally characters and enemy characters are displayed on the display 26. The ally characters are operated via computer control, inflicting damage on the enemy characters and suffering damage from the enemy characters. In addition, the enemy characters are operated via computer control, inflicting damage on the ally characters and suffering damage from the ally characters.

When an enemy character is given damage points, the damage points are subtracted from the life points of the enemy character. Similarly, when an ally character is given damage points, the damage points are subtracted from the life points of the ally character. When the life points of all enemy characters become 0, the player wins the battle game (clears the battle game), and when the life points of all ally characters become 0 (loses the battle game), the player loses the battle game.

Here, in the lower section of the battle game screen 80, an ally character display region 81 is provided, as shown in FIG. 5A. In the ally character display region 81, life points 81*a* and a killer technique gauge 81*b* for each of the ally characters are displayed. The killer technique gauge 81*b* increases when the ally character suffers damage from an enemy character or inflicts damage on an enemy character. Also, when the killer technique gauge 81*b* reaches a prescribed maximum value, that ally character becomes able to use the killer technique. The killer technique gives more damage points to an enemy character than a normal attack, recovers the life points of an ally character, produces a special effect on an enemy character, and so on.

Here, there are two patterns of methods for using the killer technique. In one of the patterns, the player operates (taps) an ally character whose killer technique gauge 81*b*, displayed in the ally character display region 81, has reached the maximum value. In the other pattern, when the killer technique gauge 81*b* reaches the maximum value in an auto state, the ally character uses the killer technique via computer control. Note that an auto selection operation section 82*a* is displayed on the battle game screen 80, so that the player can switch between the auto state and a manual state by operating the auto selection operation section 82*a*. When the auto selection operation section 82*a* is operated in the manual state, the auto state in which the killer technique is used automatically is entered. In addition, when the auto selection operation section 82*a* is operated in the auto state, the manual state in which the killer technique is used manually is entered. Note that, even in the auto state, the player can also use the killer technique when the player operates (taps) an ally character in a state in which the killer technique gauge 81*b* reaches the maximum value and the killer technique is not used via computer control.

Furthermore, a quick-feed selection operation section 82*b* is displayed on the battle game screen 80, so that the player can quickly feed the execution of the battle in the battle game by operating the quick-feed selection operation section 82*b* in the auto state or the manual state. For example, there may be only one level of quick feed speed or multiple levels of quick feed speed. For example, the game can be preset so that the player can double the battle execution speed in the battle game by tapping the quick-feed selection operation section 82*b* once and quadruple the battle execution speed in the battle game by tapping the quick-feed selection operation section 82*b* twice. In addition, the level of quick feed speed to be set may be made to differ depending on the type of the battle game.

Then, when the battle game normally ends (normal end), the result screen 83 is displayed on the display 26, as shown in FIG. 5B. FIG. 5B shows the result screen 83, as an example, in the case where the ally characters have won.

On the result screen 83, a report display operation section 84 captioned "Report" and an end operation section 85 captioned "Close" are displayed, together with at least a portion of game result information of the battle game.

Note that the game result information includes: the ally character IDs (party) of ally characters; the enemy character IDs of enemy characters; information about remaining situations of the ally characters and the enemy characters at the time the battle ended (whether or not the life points were 0 at the time the battle game ended); given damage points (total value); player operation information (manual state or auto state); a battle log ID; information about the type of the battle game (main quest, dungeon, etc.); information associated with each type of battle game (clearance information, floor of the battle game, etc.); information about granted items; etc.

When the end operation section 85 is operated (tapped) on the result screen 83, the display on the display 26 switches from the battle screen to a normal screen. In short, the result screen 83 is a portion of the battle screen. Note that the normal screen to which the result screen 83 is switched may be the screen displayed just before being switched to the battle screen or may be a predetermined screen, such as the home screen 40. In this manner, the battle game ends along with the end of the display of the result screen 83.

When the report display operation section 84 is operated (tapped) on the result screen 83, the report screen 86 shown in FIG. 5C is displayed on the display 26. The damage points (total value) given by the ally characters and the enemy characters, as well as the end operation section 85, are displayed on the report screen 86.

When the end operation section 85 is operated (tapped) here, the result screen 83 shown in FIG. 5B is displayed on the display 26.

Next, the 1V1 battle and the 3V3 battle will be described. Basic parts of a battle game in these battles are the same as those in the main quest, and a description thereof will be omitted. Instead, parts that differ from those in the main quest will be described.

The 1V1 battle is a battle game (battle game) for combating against a party for the 1V1 battle that has been associated in advance with another player ID. That is, each player has a preset party for the 1V1 battle. Also, the 3V3 battle is a battle game for combating against three parties for the 3V3 battle that have been associated in advance with another player ID. That is, each player has three preset parties for the 3V3 battle. The 1V1 battle and the 3V3 battle have gameplay in which players compete for ranking (places) according to wins and losses in battles between the players. More specifically, each of the 1V1 battle and the 3V3 battle is battle-type content (first content) in which a first organization organized with characters of a first player (current player) is made to combat against a second organization organized with characters of a second player (another player) to compete for places. Also, the players are granted items (ranking rewards) according to their places in the 1V1 battle and the 3V3 battle determined at a prescribed time clock that has been preset. In other words, the contents of rewards are determined on the basis of final places of the players determined over a prescribed time period from the previous prescribed time clock to the next prescribed time clock.

In this embodiment, 15:00 is set as the prescribed time clock each day. Note that it suffices if a prescribed time clock is preset, and the prescribed time clock is not limited to a specific time clock. A plurality of time clocks each day, such as 12:00 and 18:00 each day, may be set as the prescribed time clock. Alternatively, the prescribed time clock may be set at prescribed intervals, such as 15:00 every Monday or 15:00 on the 20th of every month. The 1V1 battle and the 3V3 battle are the same except for the number of parties used for a battle game (i.e., one party is used for the 1V1 battle, and three parties are used for the 3V3 battle). Hence, in this embodiment, the 1V1 battle will be described below in detail.

Figures 6A, 6B, 6C:
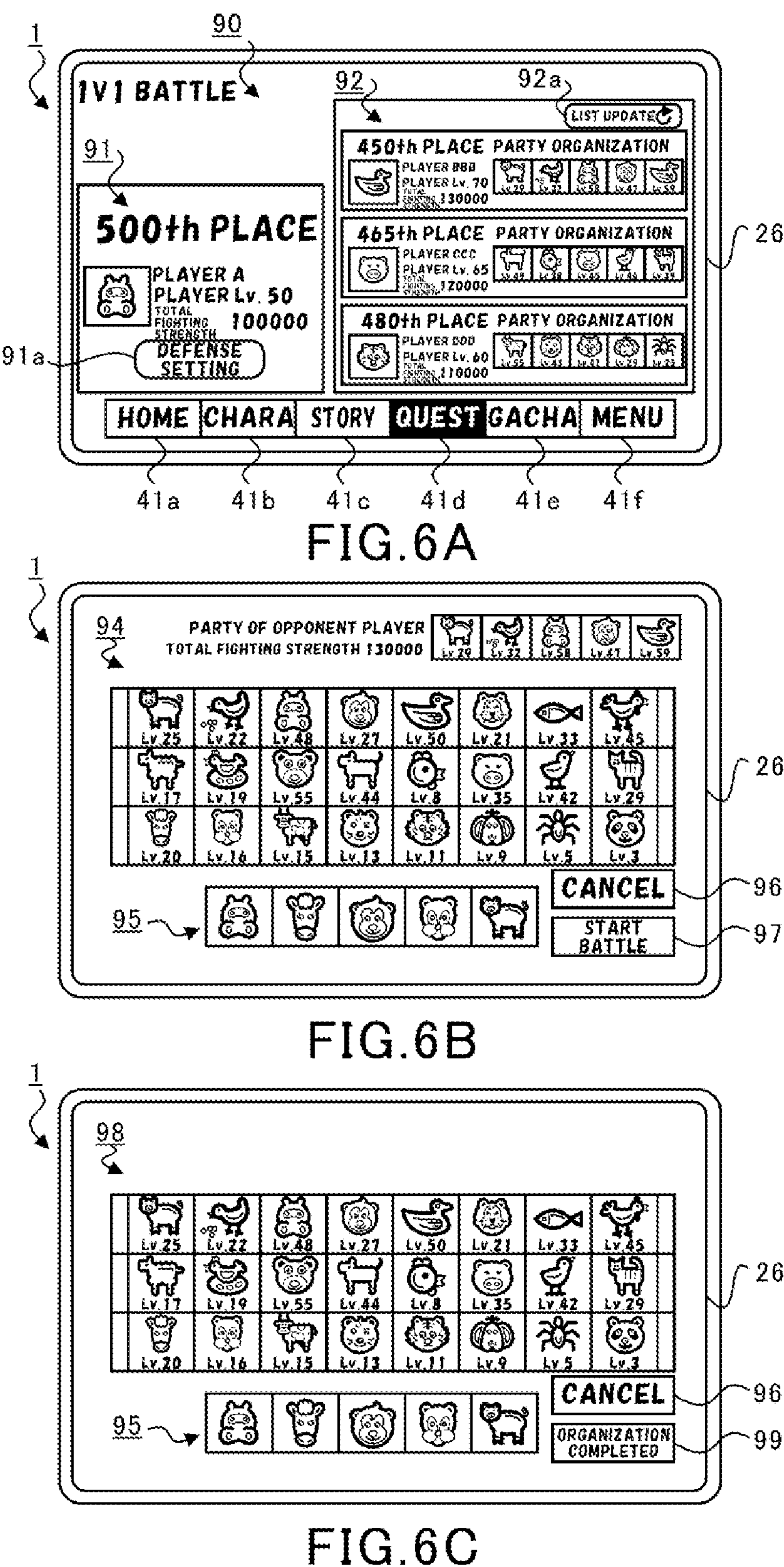
FIG. 6A is a drawing for illustrating an example of a 1V1 battle screen.
FIG. 6B is a drawing for illustrating an example of a party selection screen for attack organization.
FIG. 6C is a drawing for illustrating an example of a party selection screen for defense organization.

FIG. 6A is a drawing for illustrating an example of a 1V1 battle screen 90. FIG. 6B a drawing for illustrating an example of a party selection screen 94 for attack organization. FIG. 6C is a drawing for illustrating an example of a party selection screen 98 for defense organization.

When the 1V1-battle selection operation section 51*c* on the quest screen 50 shown in FIG. 3C is operated, the 1V1 battle screen 90 shown in FIG. 6A is displayed on the display 26. The 1V1 battle is a battle game for combating against a party for the 1V1 battle that has been associated in advance with another player ID. Each player has a preset party for the 1V1 battle. A player information display region 91 and an opponent-player list display region 92 are displayed on the 1V1 battle screen 90.

Various types of information about the player are displayed in the player information display region 91. More specifically, the player's place in the 1V1 battle, the player's player name, the player's player level, and the total fighting strength of ally characters possessed by the player are displayed. Here, the total fighting strength of the attack organization party currently set by the player is displayed in the player information display region 91. More specifically, the total fighting strength of the attack organization party used by the player in the previous 1V1 battle is displayed in the player information display region 91. In addition, a defense setting operation section 91*a* for organizing a party for defending the player's place in the 1V1 battle is displayed in the player information display region 91.

A list of opponent players is displayed in the opponent-player list display region 92, showing multiple (three in this case) parties of other players. Basically, three other players whose places in the 1V1 battle are higher than the player's place are randomly displayed in the opponent-player list display region 92. For example, another player who is in a place higher than the player's place by a predetermined number (e.g., 50) in the 1V1 battle is randomly displayed. It should be noted, however, that in irregular cases, such as in a case where the current player's place in the 1V1 battle is higher (e.g., 1st to 3rd), other players whose places are lower than the current player's place may be randomly displayed in order to secure opponent players.

In addition, various types of information are displayed for each of the other players in the opponent-player list display region 92. More specifically, the place of each of the other players in the 1V1 battle, the player name of each of the other players, the player level of each of the other players, the total fighting strength of ally characters possessed by each of the other players, and characters of the defense organization party set by each of the other players are displayed. Here, the total fighting strength of the defense organization party set by each of the other players is displayed in the opponent-player list display region 92.

In addition, a list update operation section 92*a* is displayed in the opponent-player list display region 92. When the list update operation section 92*a* is operated, the list of opponent players displayed in the opponent-player list display region 92 is updated.

Also, when the player selects the party of another player to combat against from the other players displayed in the opponent-player list display region 92, the party selection screen 94 for attack organization shown in FIG. 6B is displayed on the display 26. On the party selection screen 94, all ally characters possessed by the player are displayed, and, below the ally characters, a selected-ally-character display region 95 for displaying the selected ally characters is displayed. The player then determines his/her party and starts a battle game in the same manner as in the main quest.

In addition, a cancel operation section 96 and a battle-start operation section 97 captioned "Start battle" are displayed on the party selection screen 94. When the player operates (taps) a displayed ally character on the party selection screen 94, the operated ally character is displayed in the selected-ally-character display region 95. That is, here, an ally character ID is selected for use in the battle game (for determining a party) from among the plurality of ally character IDs associated with the player ID. An attack organization party is organized as a result of the player selecting a plurality of ally characters. Note that the same ally character cannot be set in duplicate in a party organization. When the battle-start operation section 97 is operated (tapped), the battle game is started. In addition, an attack organization party used for the player to combat against another player in the 1V1 battle is set as a result of the battle-start operation section 97 being operated.

When the defense setting operation section 91*a* shown in FIG. 6A is operated, the party selection screen 98 for defense organization shown in FIG. 6C is displayed on the display. On the party selection screen 98, all ally characters possessed by the player are displayed, and, below the ally characters, a selected-ally-character display region 95 for displaying the selected ally characters is displayed. A defense organization party is organized as a result of a plurality of ally characters being selected by the player. In addition, a cancel operation section 96 and an organization completion operation section 99 captioned "Organization completed" are displayed on the party selection screen 98. A party organization for defending the player's place in the 1V1 battle is set as a result of the organization completion operation section 99 being operated.

Figure 7A:
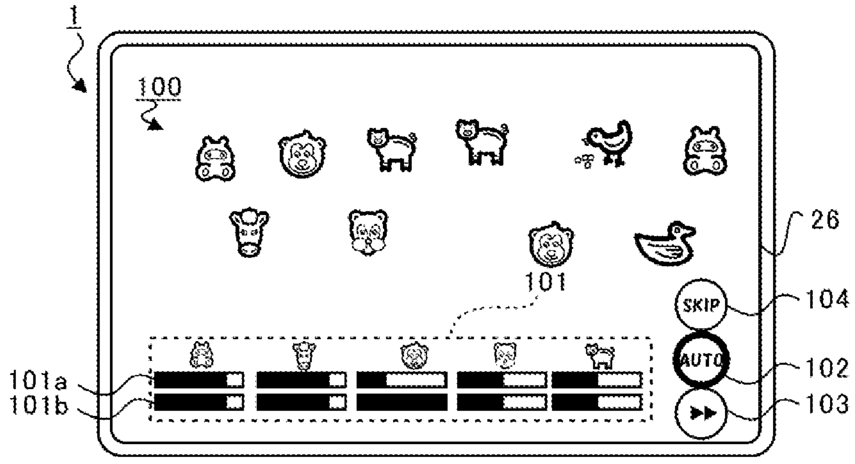
FIG. 7A is a drawing for illustrating an example of the battle game screen.
Figure 7B:
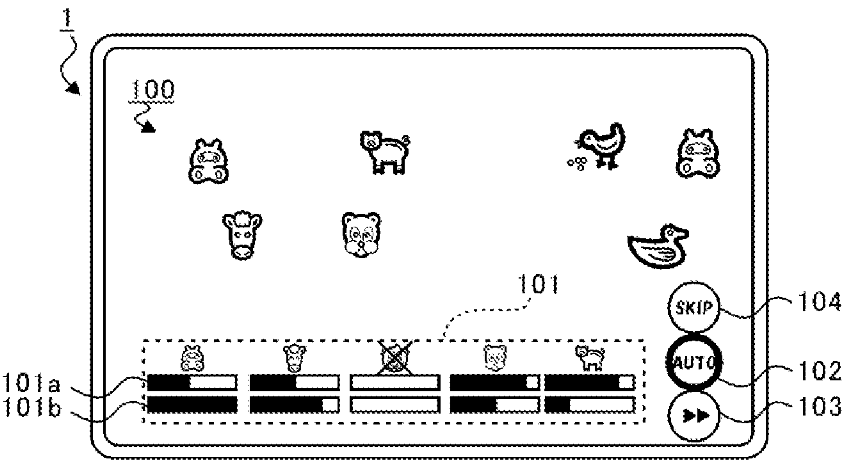
FIG. 7B is a drawing for illustrating an example of the battle game screen.
Figure 7C:
FIG. 7C is a drawing for illustrating an example of a skipping-in-progress screen.

FIGS. 7A and 7B are drawings for illustrating an example of a battle game screen. FIG. 7C is a drawing for illustrating an example of a skipping-in-progress screen. When party organization is completed and the battle-start operation section 97 shown in FIG. 6B is operated (tapped), a battle game is started, and a battle game screen 100 is displayed on the display 26, as shown in FIG. 7A. In the battle game in the 1V1 battle, a battle game between the attack organization selected by the first player (current player) and the defense organization selected by the second player (another player) is executed.

In the lower section of the battle game screen 100, an ally character display region 101 is provided, as shown in FIG. 7A. In the ally character display region 101, life points 101*a* and a killer technique gauge 101*b* for each ally character are displayed.

In addition, ally characters and enemy characters whose life points are "0" during the battle game as a result of proceeding of the battle game disappear from the battle game screen 100, as shown in FIG. 7B. In addition, an ally character whose life points are "0" during the battle game is displayed in the ally character display region 101 with a mark indicating that the ally character is unable to combat, as shown in FIG. 7B. Thus, the player is informed of battle situations in the battle game in an easy-to-recognize way.

In addition, an auto selection operation section 102 is displayed on the battle game screen 100. Note that the game is preset so that the player cannot switch between the auto state and the manual state in a battle game in the 1V1 battle, causing the battle game to proceed in the auto state at all times. Therefore, the killer technique cannot be used manually in a battle game in the 1V1 battle. For this reason, the auto selection operation section 102 is highlighted at all times, as shown in FIG. 7A.

In addition, a quick-feed selection operation section 103 is displayed on the battle game screen 100. The player can quickly feed the execution of the battle in the battle game by operating the quick-feed selection operation section 103. Here, the game is preset so that the player can double the battle execution speed in the battle game by tapping the quick-feed selection operation section 103 once and quadruple the battle execution speed in the battle game by tapping the quick-feed selection operation section 103 twice.

In addition, when the use of the skip function is allowed in the case where the game is set so that the skip function is not used in "1V1 battle", a skip selection operation section 104 is displayed on the battle game screen 100, as shown in FIG. 7A. In other words, the skip selection operation section 104 is displayed on the battle game screen 100 only when use of the skip function is allowed.

When the player operates the skip selection operation section 104, a skipping-in-progress screen 110 shown in FIG. 7C is displayed on the display 26 for a certain time period. In this embodiment, the certain time period for which the skipping-in-progress screen 110 is displayed on the display 26 when the skip function is used is shorter than the time required when the battle game is made to proceed without using the skip function and the time required when battle execution is quickly fed in the battle game as a result of the quick-feed selection operation section 103 being operated. That is, the time for which the battle game is executed is shorter in the short-cut mode (mode in which the skip function is used) than in the normal mode (mode in which the skip function is not used).

On the skipping-in-progress screen 110, not only is the entire screen of the display 26 dimmed but also the wording "Skipping" is displayed at the center of the display 26, thus informing the player that the skip function has been used. In other words, animation rendering is partially or fully omitted in the case where the skipping-in-progress screen 110 is displayed on the display 26 as a result of the skip function being used, compared with the case where the battle game screen 100 is displayed on the display 26 as a result of the skip function not being used. It is possible to mitigate the processing load at the player terminal 1 by partially or fully omitting animation rendering as described above. Note that audio output that is executed at the same time as animation rendering may also be omitted partially or fully. By doing so, it is possible to mitigate the processing load at the player terminal 1.

Figure 8A:
FIG. 8A is a drawing for illustrating an example of the result screen.
Figure 8B:
FIG. 8B is a drawing for illustrating an example of the result screen.
Figure 8C:
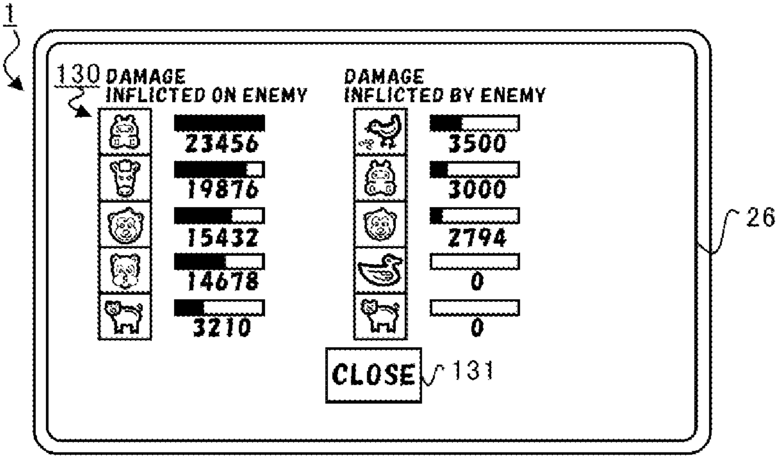
FIG. 8C is a drawing for illustrating an example of the report screen.

FIGS. 8A and 8B are drawings for illustrating an example of a result screen 120. FIG. 8C is a drawing for illustrating an example of a report screen 130. After the skipping-in-progress screen 110 shown in FIG. 7C is displayed on the display 26 for a certain time period, the result screen 120 is displayed on the display 26.

In the case where the player wins the battle game, "VICTORY" is displayed at the center of the result screen 120 as shown in FIG. 8A, informing the player that the player has won the battle game.

On the other hand, in the case where the player loses the battle game, "LOSE . . . " is displayed at the center of the result screen 120 as shown in FIG. 8B, informing the player that the player has lost the battle game. That is, at least a portion of the game result information of the battle game is displayed on the result screen 120.

In addition, a report display operation section 121 captioned "Report" and a next operation section 122 captioned "Next" are displayed on the result screen 120, as shown in FIGS. 8A and 8B.

When the report display operation section 121 is operated (tapped) on the result screen 120, the report screen 130 shown in FIG. 8C is displayed on the display 26. The content displayed on the report screen 130 is the same as that on the aforementioned report screen 86 shown in FIG. 5C, and a description thereof will be omitted.

In addition, a close operation section 131 is displayed on the report screen 130. When the close operation section 131 is operated (tapped), the result screen 120 shown in FIG. 8A or FIG. 8B is displayed on the display 26 again.

In addition, when the next operation section 122 is operated (tapped) on the result screen 120, the screen on the display 26 is switched to the 1V1 battle screen 90 shown in FIG. 6A.

Figure 9A:
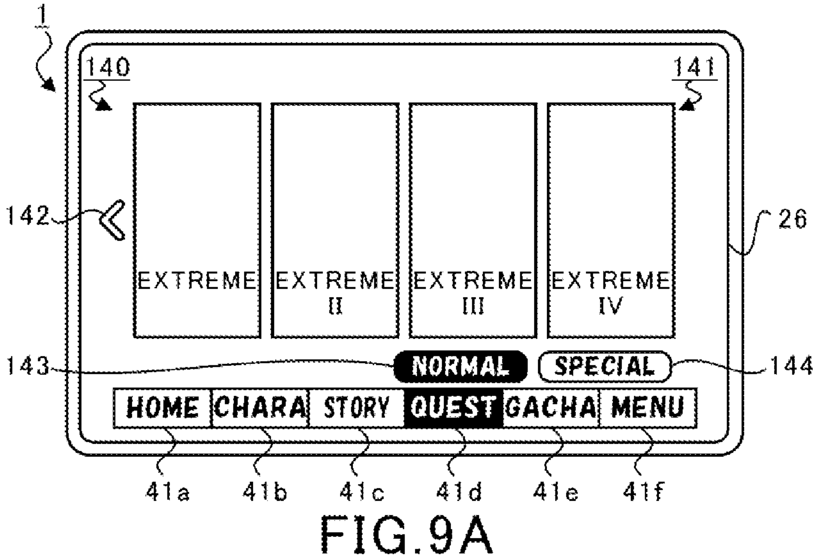
FIG. 9A is a drawing for illustrating an example of a dungeon screen.
Figure 9B:
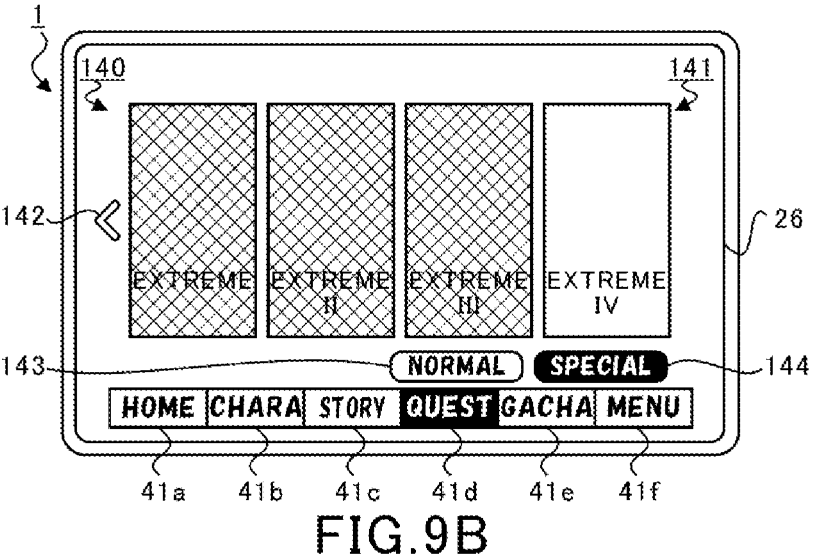
FIG. 9B is a drawing for illustrating an example of the dungeon screen.

FIGS. 9A and 9B are drawings for illustrating an example of a dungeon screen 140. When the dungeon selection operation section 51*b* on the quest screen 50 shown in FIG. 3C is operated, the dungeon screen 140 shown in FIG. 9A is displayed on the display 26. On the dungeon screen 140, a dungeon-type selection operation section 141 for selecting one of a plurality of dungeons is displayed. Also, a switching operation section 142 is displayed on the dungeon screen 140, so that a plurality of dungeons to be displayed on the dungeon screen 140 can be switched and displayed by operating the switching operation section 142.

Each of the dungeons includes a plurality of floors and constitutes solo-play-type content (second content) in which the player beats enemy characters present on each of the floors, thus aiming at finally defeating the boss enemy character present on the top floor. A treasure chest is provided on each of the floors, and various rewards can be obtained by beating the enemy characters on each of the floors. Also, each of the dungeons can be cleared by beating the boss enemy character present on the top floor.

Battle games in a dungeon are set so as to be played by the player against enemy characters different for each of the floors, and no two floors have the same battle game set therefor. The types of battle games differ from one another across the floors. That is, each of the dungeons includes a plurality of different types of battle games for each of the floors. It should be noted, however, that floors in a dungeon may have the same battle game. The battle game on each of the floors in a dungeon can be played without consuming stamina. However, the player cannot retire from the battle game on each of the floors in a dungeon. In addition, the player can play a dungeon basically only once a day.

The plurality of dungeons have different difficulty levels from one another. In this embodiment, the difficulty levels include "NORMAL", "HARD", "VERY HARD", "EXTREME", "EXTREME II", "EXTREME III", and "EXTREME IV".

The difficulty level for defeating enemy characters increases in the order of "NORMAL"<"HARD"<"VERY HARD"<"EXTREME"<"EXTREME II"<"EXTREME III"<"EXTREME IV". The dungeons have different release conditions depending on the difficulty level and are released by the player clearing respective particular main quests.

In addition, a normal dungeon switching operation section 143 captioned "Normal" and a special dungeon switching operation section 144 captioned "Special" are displayed on the dungeon screen 140. FIG. 9A shows a state in which normal dungeons are displayed on the dungeon screen 140, and FIG. 9B shows a state in which special dungeons are displayed on the dungeon screen 140. The difficulty levels for defeating enemy characters set to special dungeons are higher than those set to normal dungeons.

As shown in FIG. 9B, a dungeon in which the special dungeon is not implemented is grayed out (cross-hatched in the figure), thereby disabling the player from operating the dungeon. In the example shown in FIG. 9B, only "EXTREME IV" has the special dungeon implemented therein, indicating that the dungeon can be operated by the player.

Figure 10A:
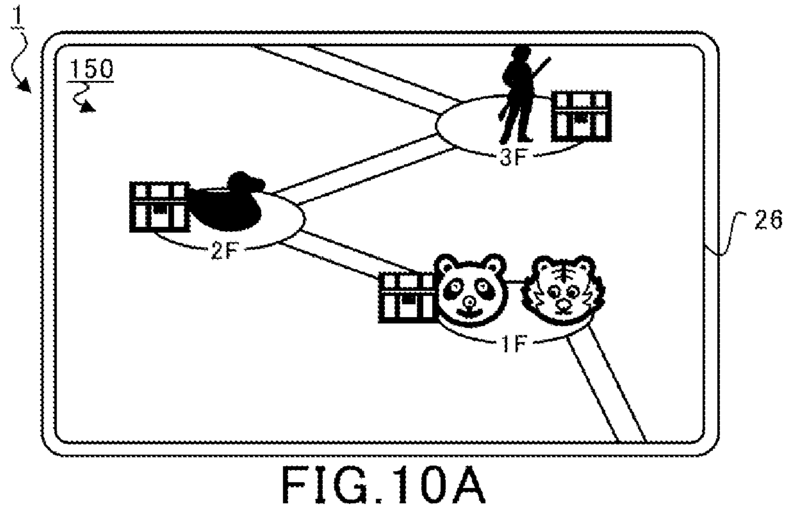
FIG. 10A is a drawing for illustrating an example of a floor screen in a dungeon.
Figure 10B:
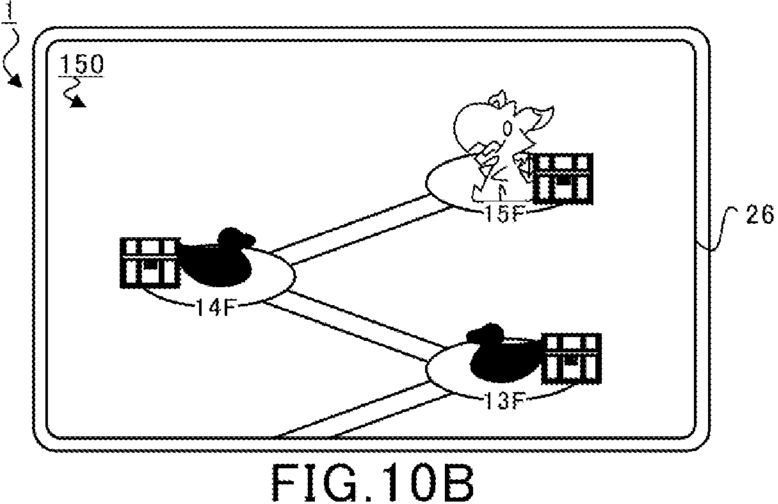
FIG. 10B is a drawing for illustrating an example of the floor screen in the dungeon.

FIGS. 10A and 10B are drawings for illustrating an example of a floor screen 150 in a dungeon. When the dungeon-type selection operation section 141 shown in FIGS. 9A and 9B is operated, the floor screen 150 shown in FIGS. 10A and 10B is displayed on the display 26.

In FIGS. 10A and 10B, the floor screen 150 for the special dungeon of "EXTREME IV" is shown as an example. The floor screen 150 for the normal dungeon is the same as that for the special dungeon, and hence a detailed description thereof will be omitted. Note that the number of floors in the special dungeon is larger than that in the normal dungeon. More specifically, the number of floors in the special dungeon of "EXTREME IV" is larger than that in the normal dungeon of the same dungeon "EXTREME IV". In addition, the levels of the boss enemy characters in the special dungeon are higher than those of the boss enemy characters in the normal dungeon. More specifically, the levels of the boss enemy characters in the special dungeon of "EXTREME IV" are higher than those of the boss enemy characters in the normal dungeon of "EXTREME IV".

As shown in FIGS. 10A and 10B, a plurality of floors are displayed on the floor screen 150. In this embodiment, floors from 1F to 15F are provided in the special dungeon. Note that display of floors 4F to 12F is omitted in FIGS. 10A and 10B. The player beats enemy characters present on floors 1F to 14F in order, aiming at defeating the boss enemy character present on top floor 15F. The game is set so that the difficulty level for defeating enemy characters becomes higher as the floor number increases.

Here, the trend of the party organizations organized with characters of the player changes as the game is updated. On the other hand, if a party organization organized with fixed enemy characters is set for each of the floors in the special dungeon, it is not possible to set a party organization that matches the trend changing as the game is updated, making it difficult to enhance the fun of the game.

Given such a background, in this embodiment, a party organization selected by the CPU from among the party organizations set by other players for the 1V1 battle is set as enemy characters other than the boss enemy characters in the special dungeon. This makes it possible to set, as enemy characters on each of the floors in the special dungeon, a party organization that matches the trend changing as the game is updated, thereby allowing the fun of the game to be enhanced.

FIG. 11 is a drawing for showing an example of list information for setting enemy characters in the special dungeon. As shown in FIG. 11, the list information includes floor information, organization type information, start place information, and end place information.

Floor information is information indicating each of the floors shown in FIGS. 10A and 10B. In FIG. 11, there is no floor information for floors 3F, 6F, 8F, 9F, 12F, and 15F. This is because boss enemy characters are set or only treasure chests without an enemy character are set to floors 3F, 6F, 8F, 9F, 12F, and 15F. That is, floor information lists floors other than floors to which a boss enemy character is set or floors to which only a treasure chest is set. Note that boss enemy characters present on floors other than the top floor have a lower level set thereto than the boss enemy character present on the top floor.

Organization type information is information indicating one of the types: attack organization for the 1V1 battle shown in FIG. 6B; and defense organization for the 1V1 battle shown in FIG. 6C. Start place information is information indicating the places from which extraction starts among the places in the 1V1 battle. End place information is information indicating the places at which extraction ends among the places in the 1V1 battle.

As shown in FIG. 11, the higher the floor number, the higher the place from which extraction starts among the places in the 1V1 battle. In other words, as the degree of progress in the plurality of battle games (floors) in the special dungeon increases, the place of a to-be-selected party organization that is organized with characters of another player becomes higher. In short, as the player approaches the boss enemy character present on top floor 15F in the special dungeon, the player is expected to combat against a party organization (attack organization, defense organization) set by a player who is in a higher place in the 1V1 battle. As shown in FIG. 11, in the special dungeon, a party organization serving as enemy characters is selected from among party organizations organized with characters of other players on the basis of the places in the 1V1 battle, which is battle-type content, the degree of progress corresponding to each floor in the special dungeon, which is solo-play-type content, and the organization type. This makes it possible to set, as enemy characters on each of the floors in the special dungeon, a party organization that matches the trend changing as the game is updated, thereby allowing the fun of the game to be enhanced.

Unlike the special dungeon, on the other hand, the list information shown in FIG. 11 is not used in the normal dungeon. In the normal dungeon, the player's party organization used when a battle game in the main quest shown in FIG. 4A was cleared is set as enemy characters on floors other than floors to which a boss enemy character is set or floors to which only a treasure chest is set. Here, in the normal dungeon, a fixed party organization set by, for example, the game administrator may be set as enemy characters, in addition to the player's party organization used when a battle game in the main quest was cleared. Note that the strength (e.g., level) of enemy characters in the normal dungeon changes according to the player level. As described above, a party organization that is set as enemy characters in the normal dungeon differs from a party organization that is set as enemy characters in the special dungeon. Here, in the normal dungeon, a party organization with a level equal to or lower than the player level is selected as enemy characters. In the special dungeon, on the other hand, a party organization is selected as enemy characters on the basis of the places in the 1V1 battle, regardless of the player level. For this reason, the strength (e.g., level) of enemy characters in the normal dungeon is basically lower than that of enemy characters in the special dungeon. In addition, in the normal dungeon, the party organization when a battle game in the main quest was cleared is selected as enemy characters. That is, in the normal dungeon, a party organization organized by the player in order to beat an enemy character having a preset status that is not affected by the trend, such as a monster against whom the player combats in the main quest, is selected as enemy characters. In the special dungeon, on the other hand, a party organization organized by another player in order to beat an opponent player in the 1V1 battle is selected as enemy characters. For this reason, the strength of enemy characters (e.g., level, strength of a party organization organized by another player in order to beat an opponent player) in the special dungeon is basically higher than that of enemy characters in the normal dungeon. By doing so, the difficulty level for defeating the enemy characters on each of the floors in the special dungeon can be set higher than in the normal dungeon.

Referring back to FIG. 10A, when a battle game aiming at defeating enemy characters in the special dungeon is started, a character of the player is displayed on floor 1F. An enemy character present on floor 1F is displayed so as to be capable of being selected by the player. Enemy characters present on floors 2F and higher are displayed such that they cannot be selected by the player until the player beats the enemy character present on floor 1F. Thus, detailed information concerning enemy characters present on floors 2F and higher is unknown.

When the player selects the enemy character present on floor 1F, enemy characters appearing in the battle game and items (rewards) that can be earned in the battle game are displayed, as shown in FIG. 4B. In addition, a challenge operation section, captioned "Challenge", for challenging the battle game, as well as a cancel operation section, captioned "Cancel", for cancelling the processing corresponding to the currently displayed screen are displayed.

When the challenge operation section is operated, the battle game shown in FIG. 7A is started. This battle game is the same as the battle game described in relation to the 1V1 battle, and hence a detailed description thereof will be omitted. When the player wins the battle game on floor 1F, he/she can earn the rewards stored in the treasure chest on floor 1F.

When the player clears floor 1F, the enemy character present on floor 2F is displayed so as to be capable of being selected by the player. In addition, enemy characters present on floors 3F and higher are displayed such that they cannot be selected by the player until the player beats the enemy character present on floor 2F. Thus, detailed information concerning enemy characters present on floors 3F and higher is unknown. Thus, the player clears floors 1F to 14F in order, aiming at clearing top floor 15F. The party organization of the player can be changed for each of the floors, and the life points 101*a* and the killer technique gauge 101*b* of each of the ally characters shown in FIG. 7A can also be carried over from floor to floor. This allows the killer technique gauge 101*b* to be set apart for later use in the battle against a boss enemy character.

Next, basic configurations and communication processing of the player terminal 1 and the server 1000 for executing the game according to this embodiment will be described. Note that an example of basic communication processing for proceeding with the game, as well as main communication processing pertaining to image display processing, will be described here, and a description of other processing will be omitted.

(Functional Configuration of Player Terminal 1)

Figure 12:
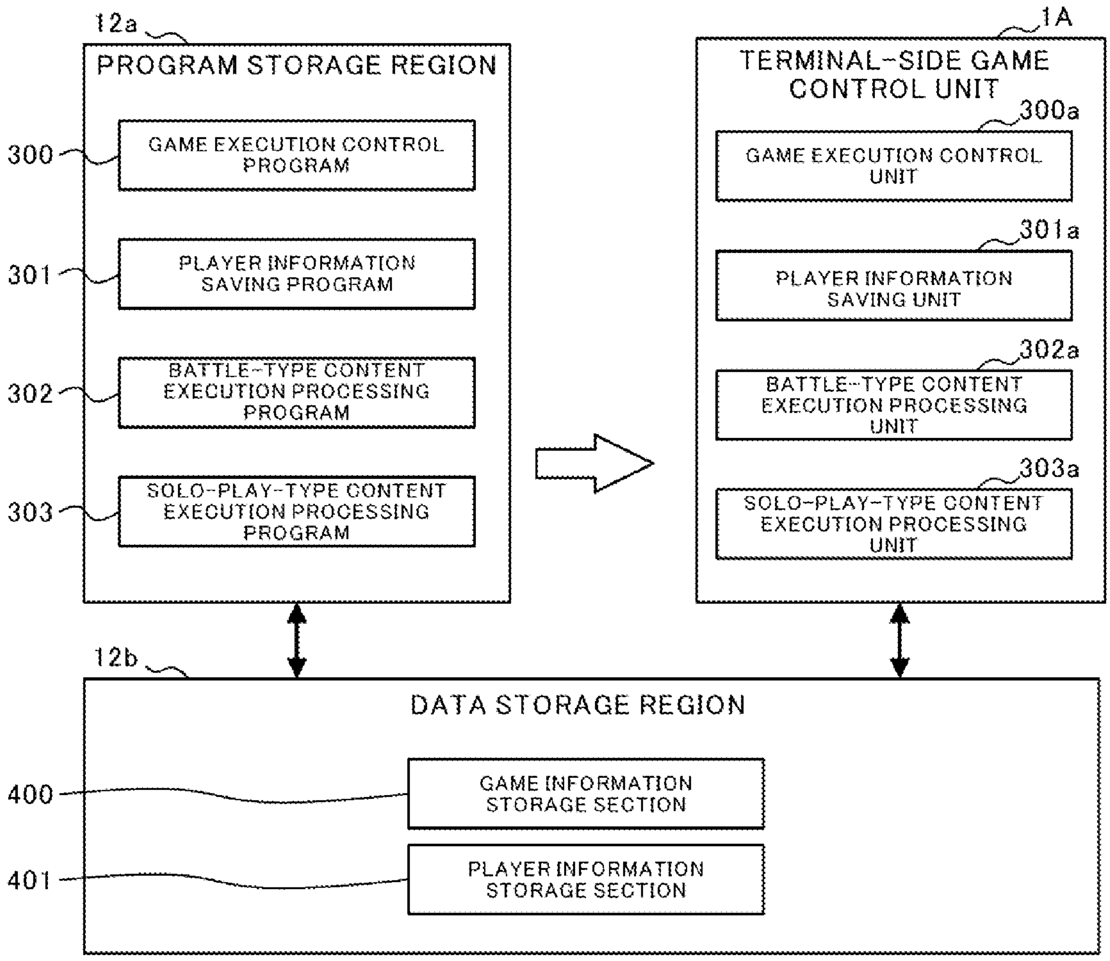
FIG. 12 is a diagram for illustrating the configuration of a memory in the player terminal and functions of the player terminal as a computer.

FIG. 12 is a diagram for illustrating the configuration of the memory 12 in the player terminal 1 and functions of the player terminal 1 as a computer. A program storage region 12*a* and a data storage region 12*b* are provided in the memory 12. When the game is started, the CPU 10 stores terminal-side game control programs (modules) in the program storage region 12*a*.

The terminal-side game control programs include: a game execution control program 300; a player information saving program 301; a battle-type content execution processing program 302; and a solo-play-type content execution processing program 303. The programs listed in FIG. 12 are examples, and many other programs are provided as the terminal-side game control programs.

In the data storage region 12*b*, a game information storage section 400 and a player information storage section 401 are provided as storage sections for storing data. Each of the aforementioned storage sections is an example, and many other storage sections are provided in the data storage region 12*b*.

The CPU 10 operates the programs stored in the program storage region 12*a* and updates data in each of the storage sections in the data storage region 12*b*. Also, the CPU 10 causes the player terminal 1 (computer) to function as a terminal-side game control unit 1A by operating the programs stored in the program storage region 12*a*. The terminal-side game control unit 1A includes: a game execution control unit 300*a*; a player information saving unit 301*a*; a battle-type content execution processing unit 302*a*; and a solo-play-type content execution processing unit 303*a*.

More specifically, the CPU 10 causes the computer to function as the game execution control unit 300*a* by operating the game execution control program 300. Similarly, the CPU 10 causes the computer to function as the player information saving unit 301*a*, the battle-type content execution processing unit 302*a*, and the solo-play-type content execution processing unit 303*a* by operating the player information saving program 301, the battle-type content execution processing program 302, and the solo-play-type content execution processing program 303, respectively.

The game execution control unit 300a controls the proceeding of the entire game. For example, the game execution control unit 300a transmits login information to the server 1000 when the player logs in the game. In addition, the game execution control unit 300a transmits opponent-player candidate request information and enemy character request information to the server 1000 on the basis of a player operation.

The player information saving unit 301a saves player information received from the server 1000 in the player information storage section 401.

The battle-type content execution processing unit 302a is responsible for controlling the execution of a battle game (battle game) in the 1V1 battle, the 3V3 battle, etc. In other words, the battle-type content execution processing unit 302a executes battle-type content in which battle games are executed by using a plurality of items of first organization information organized by a plurality of players, and the places of the players are determined on the basis of the results of the battle games. For example, the battle-type content execution processing unit 302a derives the progress and result of a battle game through a computation process. More specifically, the battle-type content execution processing unit 302a executes processing related to determination and execution of an attack carried out by each character in the battle game, processing for deciding whether or not each character has been damaged and how severely each character has been damaged, processing for selecting a motion related to position movement and dropout of each character, and processing for determining a win and a loss in the battle game. In addition, the battle-type content execution processing unit 302a executes animation rendering on the display 26 on the basis of the result of the computation process.

The solo-play-type content execution processing unit 303a is responsible for controlling the execution of a battle game in the main quest, the dungeon, etc. In other words, the solo-play-type content execution processing unit 303a executes solo-play-type content in which a battle game is advanced such that a party organization organized with characters of the player is made to combat against a CPU organization organized with characters selected by the CPU. For example, the solo-play-type content execution processing unit 303a derives the progress and result of the battle game through a computation process. More specifically, the solo-play-type content execution processing unit 303a executes processing related to determination and execution of an attack carried out by each character in the battle game, processing for deciding whether or not each character has been damaged and how severely each character has been damaged, processing for selecting a motion related to position movement and dropout of each character, and processing for determining a win and a loss in the battle game. In addition, the solo-play-type content execution processing unit 303a executes animation rendering on the display 26 on the basis of the result of the computation process.

(Functional Configuration of Server 1000)

Figure 13:
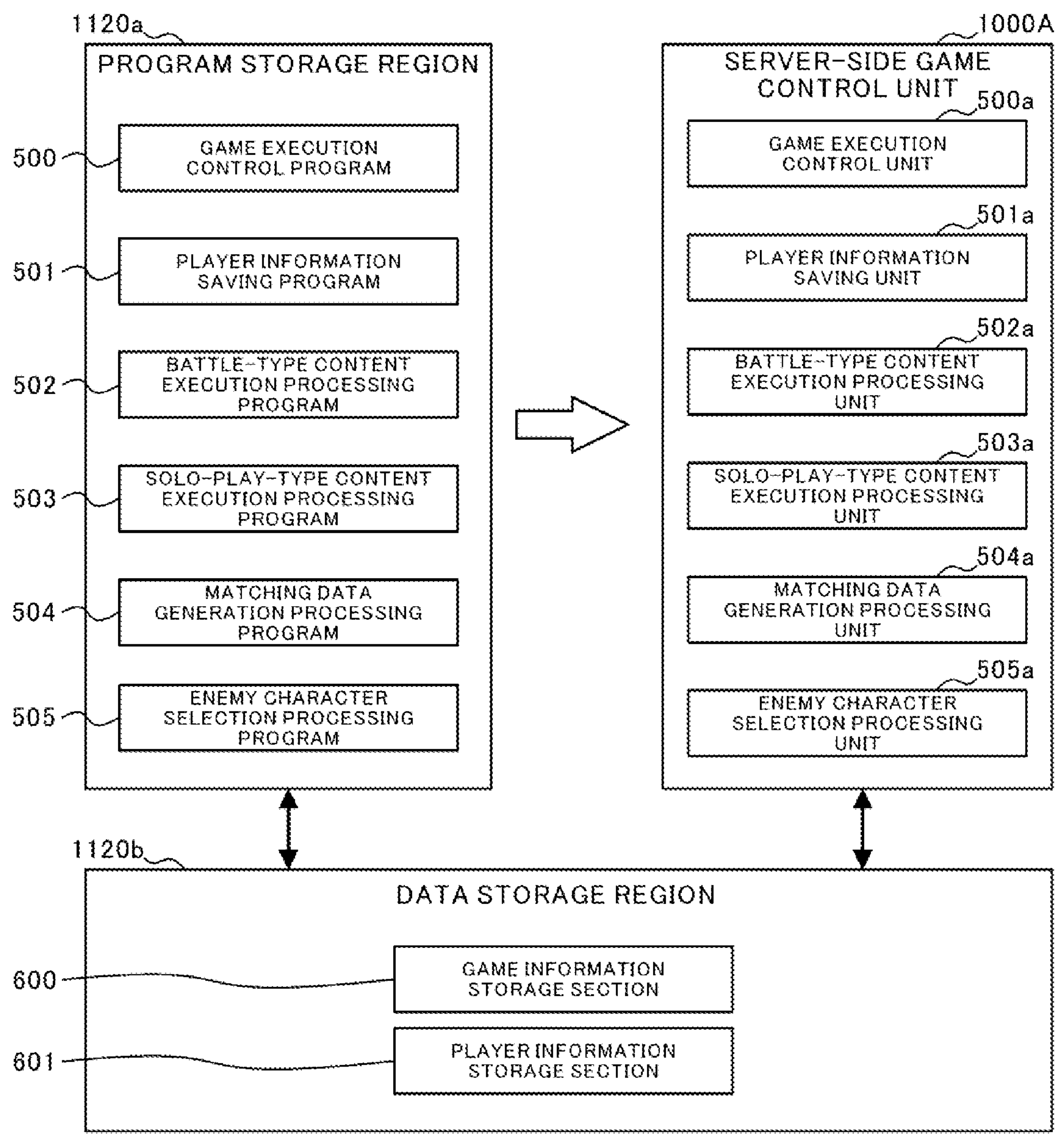
FIG. 13 is a diagram for illustrating the configuration of a memory in the server and functions of the server as a computer.

FIG. 13 is a diagram for illustrating the configuration of the memory 1120 in the server 1000 and functions of the server 1000 as a computer. A program storage region 1120a and a data storage region 1120b are provided in the memory 1120. When the game is started, the CPU 1100 stores server-side game control programs (modules) in the program storage region 1120a.

The server-side game control programs include: a game execution control program 500; a player information saving program 501; a battle-type content execution processing program 502; a solo-play-type content execution processing program 503; a matching data generation processing program 504; and an enemy character selection processing program 505. The programs listed in FIG. 13 are examples, and many other programs are provided as the server-side game control programs.

In the data storage region 1120b, a game information storage section 600 and a player information storage section 601 are provided as storage sections for storing data. Each of the aforementioned storage sections is an example, and many other storage sections are provided in the data storage region 1120b.

The CPU 1100 operates the programs stored in the program storage region 1120a and updates data in each of the storage sections in the data storage region 1120b. Also, the CPU 1100 causes the server 1000 to function as a server-side game control unit 1000A by operating the programs stored in the program storage region 1120a. The server-side game control unit 1000A includes: a game execution control unit 500a; a player information saving unit 501a; a battle-type content execution processing unit 502a; a solo-play-type content execution processing unit 503a; a matching data generation processing unit 504a; and an enemy character selection processing unit 505a.

More specifically, the CPU 1100 causes the computer to function as the game execution control unit 500a by operating the game execution control program 500. Similarly, the CPU 1100 causes the computer to function as the player information saving unit 501a, the battle-type content execution processing unit 502a, the solo-play-type content execution processing unit 503a, the matching data generation processing unit 504a, and the enemy character selection processing unit 505a by operating the player information saving program 501, the battle-type content execution processing program 502, the solo-play-type content execution processing program 503, the matching data generation processing program 504, and the enemy character selection processing program 505, respectively.

The game execution control unit 500a controls the proceeding of the entire game. For example, upon receiving login information from the player terminal 1, the game execution control unit 500a allows the player terminal 1 to download the player information saved in the player information storage section 601.

Upon downloading player information (e.g., proceeding information and game result information) from the player terminal 1, the player information saving unit 501a saves the downloaded player information in the player information storage section 601.

The battle-type content execution processing unit 502a is responsible for controlling the execution of a battle game in the 1V1 battle, the 3V3 battle, etc. For example, upon receiving opponent-player candidate request information from the player terminal 1, the battle-type content execution processing unit 502a executes processing for extracting other players serving as candidate opponent players combating against the player in the 1V1 battle and the 3V3 battle. Also, the battle-type content execution processing unit 502a allows the player terminal 1 to download, from the server 1000, opponent player information including at least the places of the extracted other players in the 1V1 battle and 3V3 battle and party organization information of the extracted other players for the 1V1 battle and 3V3 battle. Also, the battle-type content execution processing unit 502a determines the places of players on the basis of the result of a battle game. More specifically, if the player beats the other player serving as an opponent player, the battle-type content execution processing unit 502a executes processing for exchanging the player's place with that of the opponent player. In addition, the battle-type content execution processing unit 502*a* executes processing for storing a plurality of items of first organization information organized by a plurality of players in the player information storage section 601 in association with the places of the players.

The solo-play-type content execution processing unit 503*a* is responsible for controlling the execution of a battle game in the main quest, the dungeon, etc. For example, upon receiving enemy character request information from the player terminal 1, the solo-play-type content execution processing unit 503*a* allows the player terminal 1 to download, from the server 1000, enemy character information concerning the enemy characters derived by the enemy character selection processing unit 505*a* (described below). In addition, the solo-play-type content execution processing unit 503*a* grants a reward to the player when the player clears a battle game in the main quest, the dungeon, etc. More specifically, the solo-play-type content execution processing unit 503*a* adds a reward, such as an item, to the player information corresponding to the player ID of the player and saves the player information in the player information storage section 601. In addition, in the aforementioned special dungeon, the solo-play-type content execution processing unit 503*a* executes processing for executing solo-play-type content in which a battle game is advanced by using first organization information selected by the enemy character selection processing unit 505*a* (described below) and second organization information organized by the player.

The matching data generation processing unit 504*a* executes processing for generating matching data by extracting party organization information concerning attack organization parties and defense organization parties of the top 2000 players in the 1V1 battle and registering the party organization information in the table.

The enemy character selection processing unit 505*a* executes processing for selecting enemy characters, except the boss enemy character, on each of the floors in the special dungeon on the basis of, for example, matching data and the list information shown in FIG. 11. The enemy character selection processing unit 505*a* executes processing for selecting any of the plurality of stored items of first organization information on the basis of the type (floor) of the battle game played by the player, as well as the places that are stored in the player information storage section 601 and that are associated with the first organization information.

(Communication Processing Between Player Terminal 1 and Server 1000)

Figure 14:
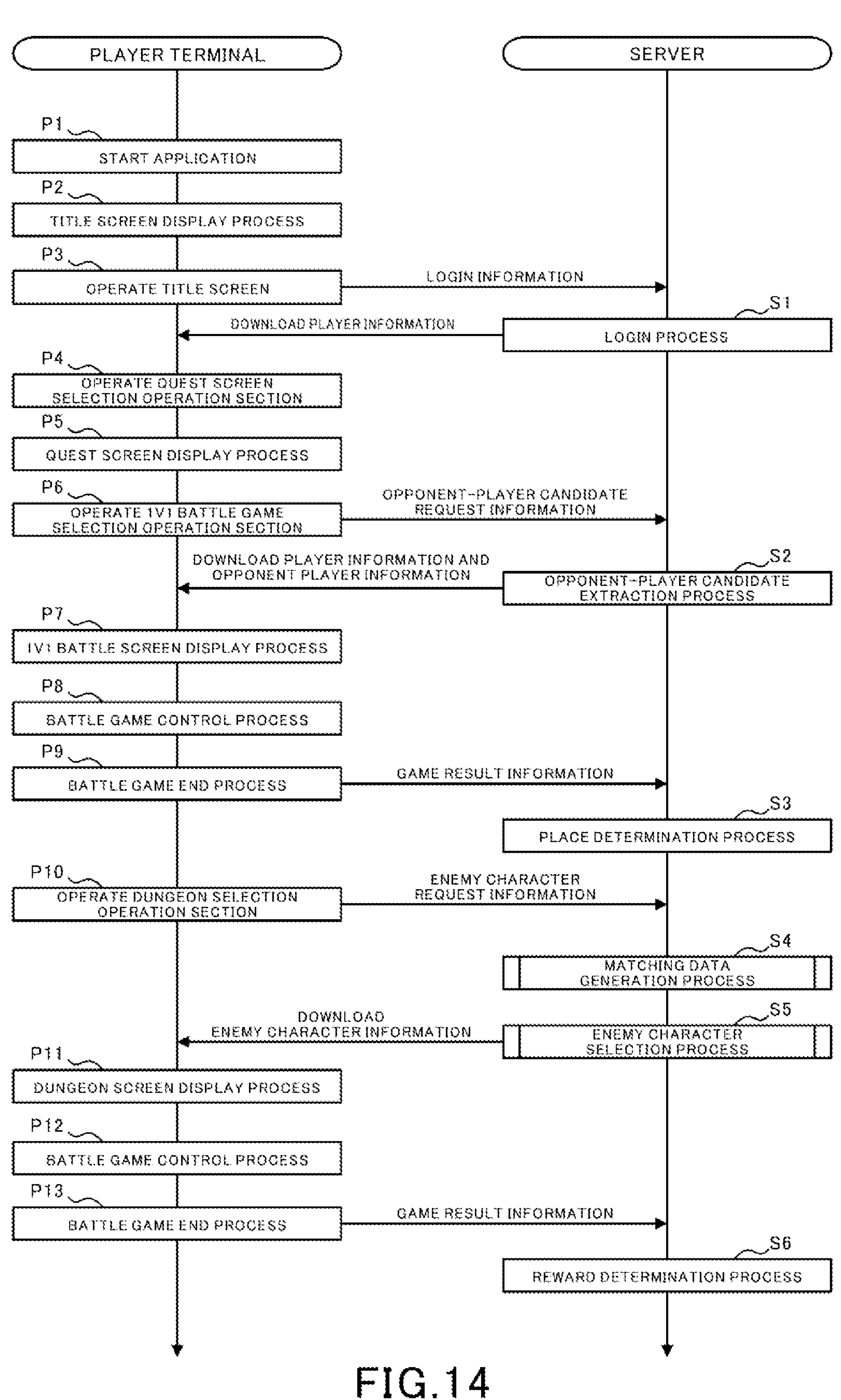
FIG. 14 is a sequence diagram for illustrating basic processing of the player terminal and the server.

FIG. 14 is a sequence diagram for illustrating basic processing of the player terminal 1 and the server 1000. Note that, in the following description, processes executed in the player terminal 1 are denoted as Pn (n is any integer). Furthermore, processes executed in the server 1000 are denoted as Sn (n is any integer).

When the player starts the game application on the player terminal 1 (P1), the game execution control unit 300*a* executes a screen display process for displaying the title screen 30 on the display 26 (P2).

When the title screen 30 is operated by the player (P3) while the title screen 30 is displayed on the display 26, the game execution control unit 300*a* transmits login information to the server 1000.

Upon receiving the login information, the game execution control unit 500*a* of the server 1000 executes a login process by identifying the player ID associated with the login information (S1). Here, the server 1000 allows the player terminal 1 to download the player information corresponding to the identified player ID from the player information storage section 601. Note that the player information includes a plurality of ally character IDs associated with the player ID, game release information indicating whether or not battle games in each type of battle games are released, the player level, the player stamina, the player's place in the 1V1 battle, in-game currency, lottery items, etc.

When the quest-screen selection operation section 41*d* in the menu bar 41 is operated on the home screen 40 (P4), the game execution control unit 300*a* of the player terminal 1 executes a quest screen display process for displaying, on the display 26, the quest screen 50 shown in FIG. 3C (P5).

When the 1V1-battle selection operation section 51*c* is operated on the quest screen 50 (P6), the battle-type content execution processing unit 302*a* transmits opponent-player candidate request information to the server 1000.

Upon receiving the opponent-player candidate request information, the battle-type content execution processing unit 502*a* of the server 1000 executes an opponent-player candidate extraction process (S2). In the opponent-player candidate extraction process (S2), the battle-type content execution processing unit 502*a* identifies the player ID associated with the opponent-player candidate request information and extracts three other players serving as candidate opponent players in the 1V1 battle.

Also, the battle-type content execution processing unit 502*a* allows the player terminal 1 to download, from the server 1000, opponent player information including at least the places of the extracted three other players in the 1V1 battle and information concerning the parties for the 1V1 battle of the extracted three other players, as well as player information including at least the player's place in the 1V1 battle.

The player information saving unit 301*a* of the player terminal 1 stores the downloaded opponent player information and player information in the data storage region 12*b* and displays the 1V1 battle screen 90 shown in FIG. 6A on the display 26 on the basis of the opponent player information and the player information (P7).

When a battle game in the 1V1 battle is executed, the battle-type content execution processing unit 302*a* executes a computation process for deriving the progress and result of the battle game (P8). More specifically, the battle-type content execution processing unit 302*a* executes a computation process for processing related to determination and execution of an attack carried out by each character in the battle game, processing for deciding whether or not each character has been damaged and how severely each character has been damaged, processing for selecting a motion related to position movement and dropout of each character, and processing for determining a win and a loss in the battle game. In other words, processing related to a win and a loss in the battle game is executed in the computation process.

The battle-type content execution processing unit 302*a* executes a battle game end process for transmitting, to the server 1000, game result information including information indicating a win and a loss in the battle game based on the result of the computation process in step S8 above (P9).

Upon receiving the game result information, the battle-type content execution processing unit 502*a* of the server 1000 executes a place determination process for determining the player's place and the place of the other player serving as an opponent player on the basis of the result of the battle game (S3). Note that, at this time, the battle-type content execution processing unit 502*a* may execute processing for transmitting, to the player terminal 1, information concerning the latest places of the first player (current player) and the second player (another player) determined in the process in S3.

When the dungeon selection operation section 51*b* is operated on the quest screen 50 (P10), the solo-play-type content execution processing unit 303*a* transmits enemy character request information to the server 1000. Here, processing to be executed in the case where the player selects the special dungeon will be described.

Upon receiving the enemy character request information, the matching data generation processing unit 504*a* executes a matching data generation process (S4). Here, for the sake of a simplified description, the matching data generation process is executed when the enemy character request information is received. However, when to execute the matching data generation process is not limited to the aforementioned timing. The matching data generation process is executed by the matching data generation processing unit 504*a* in the server 1000, for example, every certain time period.

Figure 15:
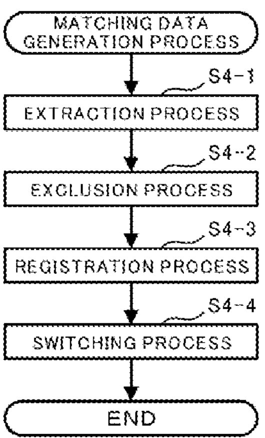
FIG. 15 is a flowchart for illustrating an example of a matching data generation process.

FIG. 15 is a flowchart for illustrating an example of the matching data generation process. As shown in FIG. 15, the matching data generation processing unit 504*a* executes an extraction process for extracting party organization information including the attack organizations and defense organizations of the top 2000 players in the 1V1 battle (S4-1). Here, in the game according to this embodiment, all players who can participate in the 1V1 battle are divided into a plurality of groups. Each of the players who can participate in the 1V1 battle belongs to any one of the plurality of groups.

The matching data generation processing unit 504*a* extracts top ten groups with the highest average player level from among the plurality of groups. Then, the matching data generation processing unit 504*a* extracts party organization information including the attack organizations and the defense organizations of the top 2000 players in each of the extracted top ten groups.

Next, the matching data generation processing unit 504*a* executes an exclusion process for excluding, from the party organization information of the extracted top 2000 players, party organization information organized with non-player characters (referred to hereinafter as NPCs) prepared by the game administrator. Also, the matching data generation processing unit 504*a* executes an exclusion process for excluding, from the party organization information of the extracted top 2000 players, party organization information organized with less than a predetermined number (less than five, here) of ally characters set by the players (S4-2). This exclusion process is executed for each of the attack organization and the defense organization.

Then, the matching data generation processing unit 504*a* executes a registration process for registering, in a table, party organization information including the attack organizations and the defense organizations obtained after the extraction process in S4-1 above and the exclusion process in S4-2 above (S4-3). The party organization information of the top 2000 players registered in the table constitutes matching data. In short, the matching data generation processing unit 504*a* generates matching data by registering, in the table, the plurality of items of party organization information in S4-3. As this matching data, two types of matching data, i.e., reference matching data and update matching data, are generated. Reference matching data is matching data that is referenced when enemy character request information is received from the player terminal 1. Update matching data is matching data that is periodically updated on the basis of party organization information including the attack organizations and the defense organizations of the top 2000 players changing over time in the 1V1 battle.

At a particular game update timing (e.g., 16:00 every day), the matching data generation processing unit 504*a* executes a switching process for switching between the update matching data and the reference matching data (S4-4). At this time, the content of the old reference matching data switched to the update matching data is discarded, and the latest matching data registered in the registration process in S4-3 is set (generated) as new update matching data. It should be noted, however, that at a particular game update timing, the update matching data may be switched to the reference matching data, and the reference matching data may be switched to the update matching data. In that case, the content of the old reference matching data switched to the update matching data may be overwritten with the latest matching data registered in the registration process in S4-3. Also, if the number of items of party organization information including player characters other than the NPCs is equal to or less than a fixed number in extracting the party organization information of the top 2000 players in S4-1 above, the matching data generation processing unit 504*a* does not execute the switching process in S4-4.

Referring back to FIG. 14, when matching data is generated, the enemy character selection processing unit 505*a* executes an enemy character selection process on the basis of the reference matching data and the list information shown in FIG. 11 (S5).

Figure 16:
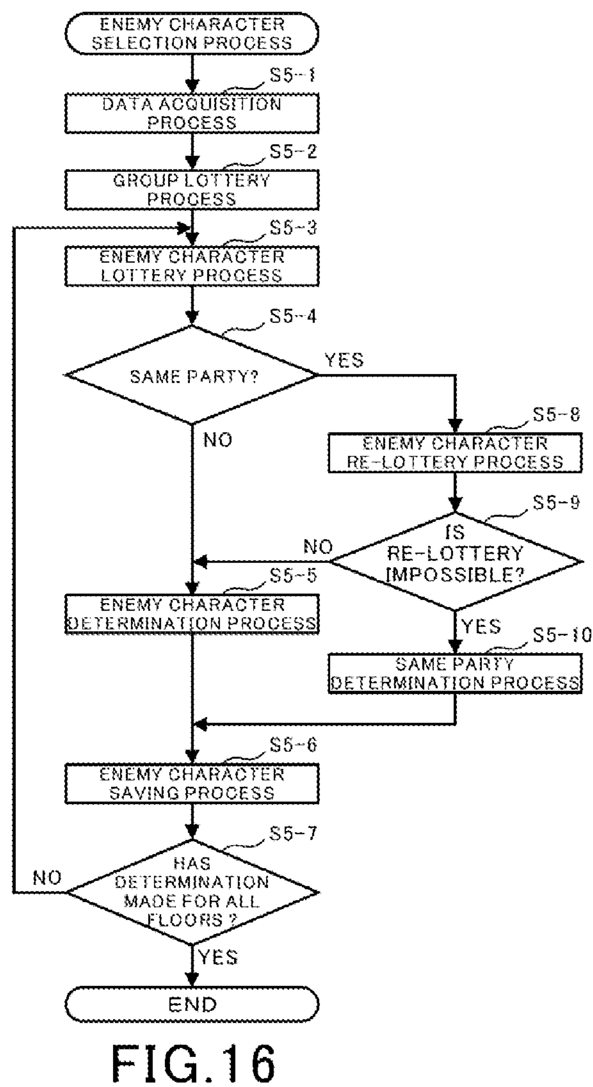
FIG. 16 is a flowchart for illustrating an example of an enemy character selection process.

FIG. 16 is a flowchart for illustrating an example of the enemy character selection process. First, as shown in FIG. 16, the enemy character selection processing unit 505*a* executes a data acquisition process for acquiring the reference matching data and the list information shown in FIG. 11 (S5-1).

Next, the enemy character selection processing unit 505*a* executes a group lottery process for randomly selecting one group by lottery from among the top ten groups, which score the highest average player levels among the plurality of groups (S5-2).

The enemy character selection processing unit 505*a* executes an enemy character lottery process for extracting enemy characters on the basis of the reference matching data of the group selected by lottery and the list information shown in FIG. 11 (S5-3). If the floor in the special dungeon is, for example, 1F, the enemy character selection processing unit 505*a* refers to the list information shown in FIG. 11 and extracts, from the reference matching data, party organization information for attack organization that is ranked in the range from the 1001th start place to the 2000th end place. At this time, the enemy character selection processing unit 505*a* extracts party organization information every predetermined division unit (e.g., every 100 items of information) in the range of rank from the 1001th start place to the 2000th end place. Then, the enemy character selection processing unit 505*a* randomly selects one item of party organization information by lottery as enemy characters from among the party organization information in a predetermined division unit (100 items of information).

Thereafter, the enemy character selection processing unit 505*a* executes processing for comparing the party organization information selected by lottery as enemy characters in S5-3 with the party organization information determined in S5-5 and maintained in S5-6 (described below). Here, the enemy character selection processing unit 505*a* determines whether or not the party organization information selected by lottery in S5-3 is identical to the party organization information determined to be enemy characters for each of the floors (S5-4). Because there is no party organization information determined to be enemy characters for a floor if the enemy characters selected in S5-3 are those selected by the first lottery, the result in S5-4 is always NO.

If the result in S5-3 is NO, the enemy character selection processing unit 505*a* executes an enemy character determination process for determining, as enemy characters, the party organization information selected by lottery in S5-3 (S5-5).

Once enemy characters are determined, the enemy character selection processing unit 505*a* executes an enemy character saving process for storing, in the game information storage section 600, the party organization information of the determined enemy characters (S5-6).

The enemy character selection processing unit 505*a* determines whether or not enemy characters have been determined for all floors other than floors to which a boss enemy character is set or floors to which only a treasure chest is set (S5-7). If the result in S5-7 is YES, the enemy character selection processing unit 505*a* ends the enemy character selection process. If the result in S5-7 is NO, the flow returns to S5-3, in which a lottery process for selecting enemy characters by lottery for another floor is executed.

On the other hand, if the result in S5-4 is YES, the enemy character selection processing unit 505*a* executes an enemy character re-lottery process for selecting party organization information as enemy characters by another lottery (S5-8). For example, the enemy character selection processing unit 505*a* randomly selects, by lottery, one item of party organization information as enemy characters from among the party organization information in another division unit that differs from the division unit used in S5-3. Also, the enemy character selection processing unit 505*a* executes the same process as in S5-3 by using reference matching data in another group that differs from the group selected by lottery in S5-2 and selects, by lottery, one item of party organization information as enemy characters.

At this time, the enemy character selection processing unit 505*a* determines whether or not party organization information has been selected by another lottery as enemy characters in S5-8 successfully, i.e., in such a manner that the selected party organization information is not identical to any party organization information that has already been determined to be enemy characters for another floor. In short, the enemy character selection processing unit 505*a* determines whether or not it is impossible to select enemy characters by another lottery (S5-9).

If the result in S5-9 is YES, the enemy character selection processing unit 505*a* executes a same party determination process for determining that the party organization information stored by the first lottery in S5-6 is enemy characters (S5-10). On the other hand, if the result in S5-9 is NO, the enemy character selection processing unit 505*a* executes the enemy character determination process for determining that the party organization information that has been selected by another lottery is enemy characters (S5-5). The aforementioned process has been described by way of an example where the enemy character selection processing unit 505*a* determines enemy characters for all floors upon receiving enemy character request information. Without limitation to this, however, the enemy character selection processing unit 505*a* may execute a process so as to determine enemy characters for a floor each time the player clears one floor.

Referring back to FIG. 14, the enemy character selection processing unit 505*a* allows the player terminal 1 to download, from the server 1000, enemy character information concerning the enemy characters determined for each of the floors.

The player information saving unit 301*a* of the player terminal 1 stores the downloaded enemy character information in the data storage region 12*b* and displays the floor screen 150 shown in FIGS. 10A and 10B on the display 26 on the basis of the enemy character information (P11).

When a battle game in the special dungeon is executed, the solo-play-type content execution processing unit 303*a* executes a computation process for deriving the progress and result of the battle game (P12). More specifically, the solo-play-type content execution processing unit 303*a* executes a computation process for processing related to determination and execution of an attack carried out by each character in the battle game, processing for deciding whether or not each character has been damaged and how severely each character has been damaged, processing for selecting a motion related to position movement and dropout of each character, and processing for determining a win and a loss in the battle game. In other words, processing related to a win and a loss in the battle game is executed in the computation process.

The solo-play-type content execution processing unit 303*a* executes a battle game end process for transmitting, to the server 1000, game result information including information indicating a win and a loss in the battle game based on the result of the computation process in step S12 above (P13).

Upon receiving the game result information, the solo-play-type content execution processing unit 503*a* of the server 1000 determines the content of a reward by referring to a reward content determination table (not shown in the figure) on the basis of the result of the battle game. Also, the solo-play-type content execution processing unit 503*a* adds the determined item (reward) to the player information corresponding to the player ID of each player, and saves the player information in the player information storage section 601.

The aforementioned embodiment has been described by way of an example of the special dungeon where the higher the floor number is, the higher the place of the party organization to be set as enemy characters is in the 1V1 battle. However, the method for setting enemy characters for each of the floors in the special dungeon is not limited to this method. For example, the plurality of floors in the special dungeon may be segmented into a plurality of segments, so that the method for setting enemy characters may differ for each of the segments. More specifically, the floors with floor numbers equal to or larger than a predetermined floor number among the floors in the special dungeon are classified into a first segment, and floors with floor numbers smaller than the predetermined floor number are classified into a second segment. In this case, in the first segment, a party organization selected by lottery from among the party organizations within a predetermined high place (e.g., 200th place) in the 1V1 battle is set as enemy characters, regardless of the player level of the player. In the second segment, on the other hand, a party organization that is comparable to the fighting strength assumed according to the player level of the player and that is selected by lottery from among the party organizations in places lower than the predetermined high place (e.g., places lower than the 201th place) in the 1V1 battle is set as enemy characters. For example, a party organization (attack organization, defense organization) having a total fighting strength within a predetermined range with respect to the fighting strength assumed according to the player level of the player is selected from the party organizations in places lower then the 201th place and is set as enemy characters. In both the first segment and the second segment, the higher the floor number, the higher the place of the party organization to be selected by lottery as enemy characters.

As described above, the player terminal 1 includes the game execution control program 300, the player information saving program 301, the battle-type content execution processing program 302, and the solo-play-type content execution processing program 303. In addition, the player terminal 1 functions as the game execution control unit 300*a*, the player information saving unit 301*a*, the battle-type content execution processing unit 302*a*, and the solo-play-type content execution processing unit 303*a*. However, some or all of these programs and functional units may be provided in the server 1000. That is, these programs and functional units may be provided in either or both of the player terminal 1 and the server 1000.

In addition, the server 1000 includes the game execution control program 500, the player information saving program 501, the battle-type content execution processing program 502, the solo-play-type content execution processing program 503, the matching data generation processing program 504, and the enemy character selection processing program 505. Furthermore, the server 1000 functions as the game execution control unit 500*a*, the player information saving unit 501*a*, the battle-type content execution processing unit 502*a*, the solo-play-type content execution processing unit 503*a*, the matching data generation processing unit 504*a*, and the enemy character selection processing unit 505*a*. However, some or all of these programs and functional units may be provided in the player terminal 1. That is, these programs and functional units may be provided in either or both of the player terminal 1 and the server 1000.

In addition, the information processing programs in the aforementioned embodiment may be stored in a computer-readable storage medium, and may be provided in the form of a storage medium. Furthermore, those programs may be provided in the form of a player terminal or an information processing system including this storage medium. Furthermore, the embodiment described above may be an information processing method for realizing the functions and the steps shown in the flowcharts.

Although an aspect of an embodiment has been described with reference to the accompanying drawings, it goes without saying that the present invention is not limited to the embodiments described above. It would be obvious that a person skilled in the art could conceive of various modifications and amendments within the scope recited in the claims, and it will be understood that those modifications and amendments obviously belong to the technical scope of the present invention.

The aforementioned embodiment has been described by way of an example where the list information shown in FIG. 11 includes organization type information. However, the organization type information is not an indispensable configuration, and the list information does not need to include organization type information.

The aforementioned embodiment has been described by way of an example where the higher the floor number, the higher the place to be extracted, as indicated in the list information shown in FIG. 11. Without limitation to this, however, the list information may be configured so that the lower the floor number, the higher the place to be extracted.

What is claimed is:

1. A non-transitory computer readable medium storing a program causing a computer to perform a method comprising:

displaying, on a display device within a player terminal, a first party selection screen for a first computer game,
  wherein the first party selection screen provides a first user interface for selecting one or more game characters from among a first plurality of game characters;

receiving, from an input unit within the player terminal, a first player input from a first player for the first computer game in response to displaying the first party selection screen;

determining, based on the first player input, a selection of a first party among the first plurality of game characters that are displayed within the first party selection screen;

executing, in response to determining the selection of the first party, the first computer game over a communication network through communication between the player terminal and a server,
  wherein the first computer game comprises a first battle game that is executed using a first plurality of parties that are operated by a plurality of players over the communication network, and
  wherein the first party is among the first plurality of parties that are operated within the first battle game in the first computer game;

determining a place of the first player among the plurality of players in a ranking for the first computer game,
  wherein the ranking is based on a result of the first battle game in the first computer game each;

storing the first plurality of parties that are operated within the first battle game in association with the ranking for the first computer game to produce a plurality of stored parties;

displaying, on the display device, a second party selection screen for a second computer game,
  wherein the second party selection screen provides a second user interface for selecting one or more game characters from among a second plurality of game characters,
  wherein the second plurality of game characters are based on the plurality of stored parties and the place of the first player in the ranking for the first computer game, and
  wherein the second plurality of game characters are further based on a computer game type of the second computer game among a plurality of computer game types;

receiving, from the input unit within the player terminal, a second player input from the first player for the second computer game in response to displaying the second party selection screen on the display device;

determining, based on the second player input, a selection of a second party among the second plurality of game characters that are displayed within the second party selection screen; and executing, in response to determining the selection of the second party, the second computer game over the communication network through communication between the player terminal and the server, wherein the second computer game comprises a second battle game that is executed using the second party and a second plurality of parties that are operated by a computer over the communication network, wherein the second battle game is among a plurality of battle games of different game types that are operated during the second computer game, and wherein the second plurality of parties are determined for the computer based on a degree of progress of the second computer game in completing the plurality of battle games, and wherein the computer determines the second plurality of parties based on a higher place of the first player in the ranking corresponding to a higher selection of stored parties in association with the ranking.

2. The non-transitory computer readable medium according to claim 1, wherein the first plurality of parties each of the plurality of players corresponds to a plurality of organization types comprising an attack party and a defense party, and wherein the second party is selected from the plurality of stored parties based on the type of an organization type that is preset from the attack party and the defense party.

3. The non-transitory computer readable medium according to claim 2, wherein the second plurality of parties comprises the second plurality of game characters appearing in order as the second computer game proceeds, and wherein a place in the first computer game of a third party appearing later in the second computer game is superior to that of a fourth party appearing earlier in the second computer game.

4. The non-transitory computer readable medium according to claim 1, wherein the second plurality of parties comprises the second plurality of game characters appearing in order as the second computer game proceeds, and wherein a place in the first computer game of a third party appearing later in the second computer game is superior to that of a fourth party appearing earlier in the second computer game.

5. An information processing method executed by at least one computer, the information processing method comprising:

displaying, on a display device within a player terminal, a first party selection screen for a first computer game, wherein the first party selection screen provides a first user interface for selecting one or more game characters from among a first plurality of game characters;

receiving, from an input unit within the player terminal, a first player input from a first player for the first computer game in response to displaying the first party selection screen;

determining, based on the first player input, a selection of a first party among the first plurality of game characters that are displayed within the first party selection screen;

executing, in response to determining the selection of the first party, the first computer game over a communication network through communication between the player terminal and a server, wherein the first computer game comprises a first battle game that is executed using a first plurality of parties that are operated by a plurality of players, and wherein the first party is among the first plurality of parties that are operated within the first battle game in the first computer game;

determining a place of the first player among the plurality of players in a ranking for the first computer game, wherein the ranking is based on a result of the first battle game in the first computer game;

storing the first plurality of parties that are operated within the first battle game in association with the ranking for the first computer game to produce a plurality of stored parties;

displaying, on the display device, a second party selection screen for a second computer game, wherein the second party selection screen provides a second user interface for selecting one or more game characters from among a second plurality of game characters, wherein the second plurality of game characters are based on the plurality of stored parties and the place of the first player in the ranking for the first computer game, and wherein the second plurality of game characters are further based on a computer game type of the second computer game among a plurality of computer game types;

receiving, from the input unit within the player terminal, a second player input from the first player for the second computer game in response to displaying the second party selection screen on the display device;

determining, based on the second player input, a selection of a second party among the second plurality of game characters that are displayed within the second party selection screen; and executing, in response to determining the selection of the second party, the second computer game over the communication network through communication between the player terminal and the server, wherein the second computer game comprises a second battle game that is executed using the second party and a second plurality of parties that are operated by a computer over the communication network, wherein the second battle game is among a plurality of battle games of different game types that are operated during the second computer game, and wherein the second plurality of parties are determined for the computer based on a degree of progress of the second computer game in completing the plurality of battle games, and wherein the computer determines the second plurality of parties based on a higher place of the first player in the ranking corresponding to a higher selection of stored parties in association with the ranking.

6. An information processing system comprising:

a computer processor; and a memory connected to the computer processor, wherein the memory comprises a program that, when executed by the computer processor, is configured to perform a method comprising:

displaying, on a display device within a player terminal, a first party selection screen for a first computer game, wherein the first party selection screen provides a first user interface for selecting one or more game characters from among a first plurality of game characters;

receiving, from an input unit within the player terminal, a first player input from a first player for the first computer game in response to displaying the first party selection screen;

determining, based on the first player input, a selection of a first party among the first plurality of game characters that are displayed within the first party selection screen;

executing, in response to determining the selection of the first party, the first computer game over a communication network through communication between the player terminal and a server, wherein the first computer game comprises a first battle game that is executed using a first plurality of parties that are operated by a plurality of players, and wherein the first party is among the first plurality of parties that are operated within the first battle game in the first computer game;

determining a place of the first player among the plurality of players in a ranking for the first computer game, wherein the ranking is based on a result of the first battle game in the first computer game;

storing the first plurality of parties that are operated within the first battle game in association with the ranking for the first computer game to produce a plurality of stored parties;

displaying, on the display device, a second party selection screen for a second computer game, wherein the second party selection screen provides a second user interface for selecting one or more game characters from among a second plurality of game characters, wherein the second plurality of game characters are based on the plurality of stored parties and the place of the first player in the ranking for the first computer game, and wherein the second plurality of game characters are further based on a computer game type of the second computer game among a plurality of computer game types;

receiving, from the input unit within the player terminal, a second player input from the first player for the second computer game in response to displaying the second party selection screen on the display device;

determining, based on the second player input, a selection of a second party among the second plurality of game characters that are displayed within the second party selection screen; and executing, in response to determining the selection of the second party, the second computer game over the communication network through communication between the player terminal and the server, wherein the second computer game comprises a second battle game that is executed using the second party and a second plurality of parties that are operated by a computer over the communication network, wherein the second battle game is among a plurality of battle games of different game types that are operated during the second computer game, and wherein the second plurality of parties are determined for the computer based on a degree of progress of the second computer game in completing the plurality of battle games, and wherein the computer determines the second plurality of parties based on a higher place of the first player in the ranking corresponding to a higher selection of stored parties in association with the ranking.

* * * * *